(12) United States Patent
Aoki et al.

(10) Patent No.: US 11,694,675 B2
(45) Date of Patent: Jul. 4, 2023

(54) INFORMATION PROCESSING APPARATUS, INFORMATION PROCESSING SYSTEM, AND INFORMATION PROCESSING METHOD

(71) Applicant: SONY CORPORATION, Tokyo (JP)

(72) Inventors: Hidenori Aoki, Chiba (JP); Fujio Arai, Tokyo (JP); Yusuke Kudo, Kanagawa (JP); Gen Hamada, Tokyo (JP); Naoyuki Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 266 days.

(21) Appl. No.: 16/969,446

(22) PCT Filed: Nov. 29, 2018

(86) PCT No.: PCT/JP2018/044016
§ 371 (c)(1),
(2) Date: Aug. 12, 2020

(87) PCT Pub. No.: WO2019/163242
PCT Pub. Date: Aug. 29, 2019

(65) Prior Publication Data
US 2021/0005177 A1 Jan. 7, 2021

(30) Foreign Application Priority Data

Feb. 20, 2018 (JP) ................................ 2018-027507

(51) Int. Cl.
*G10L 15/01* (2013.01)
*G06N 20/00* (2019.01)
*G10L 25/27* (2013.01)

(52) U.S. Cl.
CPC .............. *G10L 15/01* (2013.01); *G06N 20/00* (2019.01); *G10L 25/27* (2013.01)

(58) Field of Classification Search
None
See application file for complete search history.

(56) References Cited

U.S. PATENT DOCUMENTS 9,153,231 B1 * 10/2015 Salvador ................. G10L 15/16
9,460,713 B1 * 10/2016 Moreno Mengibar ......................
G10L 15/07
(Continued)

FOREIGN PATENT DOCUMENTS

JP 2006-146008 A 6/2006
JP 2007-004052 A 1/2007
(Continued)

OTHER PUBLICATIONS

International Search Report and Written Opinion of PCT Application No. PCT/JP2018/044016, dated Jan. 29, 2019, 10 pages of ISRWO.
(Continued)

*Primary Examiner* — Douglas Godbold
(74) *Attorney, Agent, or Firm* — Chip Law Group

(57) ABSTRACT

Provided is an apparatus that includes a voice recognition section that executes a voice recognition process on a user speech and a learning processing section that executes a process of updating a degree of confidence on the basis of an interaction made between a user and the information processing apparatus after the user speech. The degree of confidence is an evaluation value indicating the reliability of a voice recognition result of the user speech. The voice recognition section generates data on degrees of confidence in recognition of the user speech in which data plural user speech candidates based on the voice recognition result of the user speech are associated with the degrees of confidence which are evaluation values each indicating reliability of the corresponding user speech candidate.

12 Claims, 13 Drawing Sheets

(56) References Cited

U.S. PATENT DOCUMENTS

| | | | |
|---|---|---|---|
| 10,425,780 B1* | 9/2019 | Devaraj | G10L 15/22 |
| 11,043,205 B1* | 6/2021 | Su | G10L 15/183 |
| 11,189,268 B2* | 11/2021 | Park | G10L 15/22 |
| 2014/0372120 A1* | 12/2014 | Harsham | G10L 15/22 |
| | | | 704/251 |
| 2015/0142420 A1* | 5/2015 | Sarikaya | G10L 15/1815 |
| | | | 704/9 |
| 2017/0060994 A1* | 3/2017 | Byron | G06F 16/3344 |
| 2017/0256255 A1* | 9/2017 | Bocklet | G10L 15/193 |
| 2018/0053502 A1* | 2/2018 | Biadsy | G10L 15/18 |
| 2018/0314689 A1* | 11/2018 | Wang | G10L 15/1822 |
| 2019/0073994 A1* | 3/2019 | Parthasarathy | G10L 25/48 |
| 2021/0335354 A1* | 10/2021 | Park | G10L 15/10 |

FOREIGN PATENT DOCUMENTS

| | | |
|---|---|---|
| JP | 2007-322757 A | 12/2007 |
| JP | 2008-145697 A | 6/2008 |
| JP | 2011-158902 A | 8/2011 |
| JP | 2014-035361 A | 2/2014 |
| JP | 2014-048506 A | 3/2014 |
| JP | 2017-090611 A | 5/2017 |
| WO | 2017/081960 A1 | 5/2017 |

OTHER PUBLICATIONS

Matsumoto, et al., "Voice Recognition Using Corrected Reliability Based on Inter-utterance Word Co-occurrence Relation", Proceedings of the 12th Annual Meeting of the Association for Natural Language Processing, ISSN 2188-4420, Mar. 12, 2006, pp. 28-29.

* cited by examiner

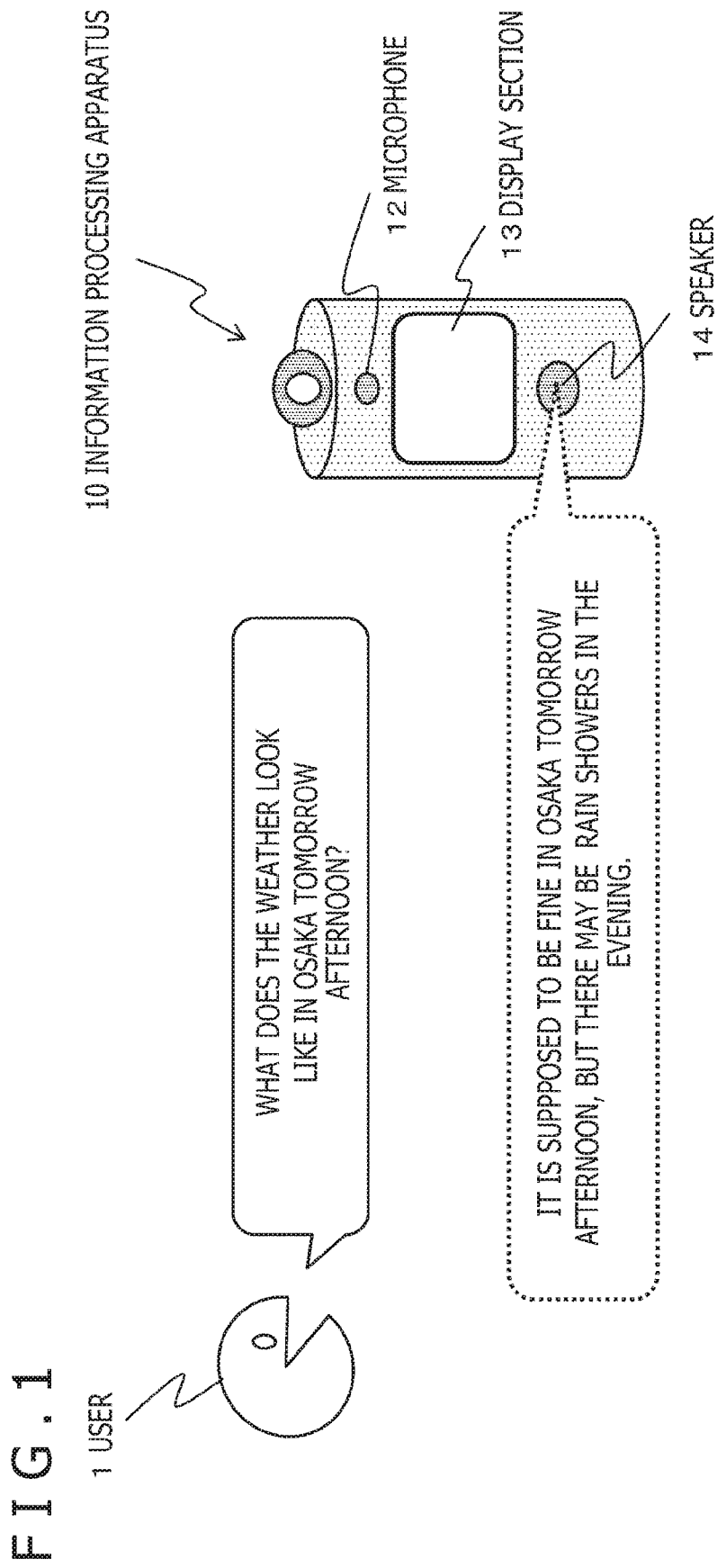

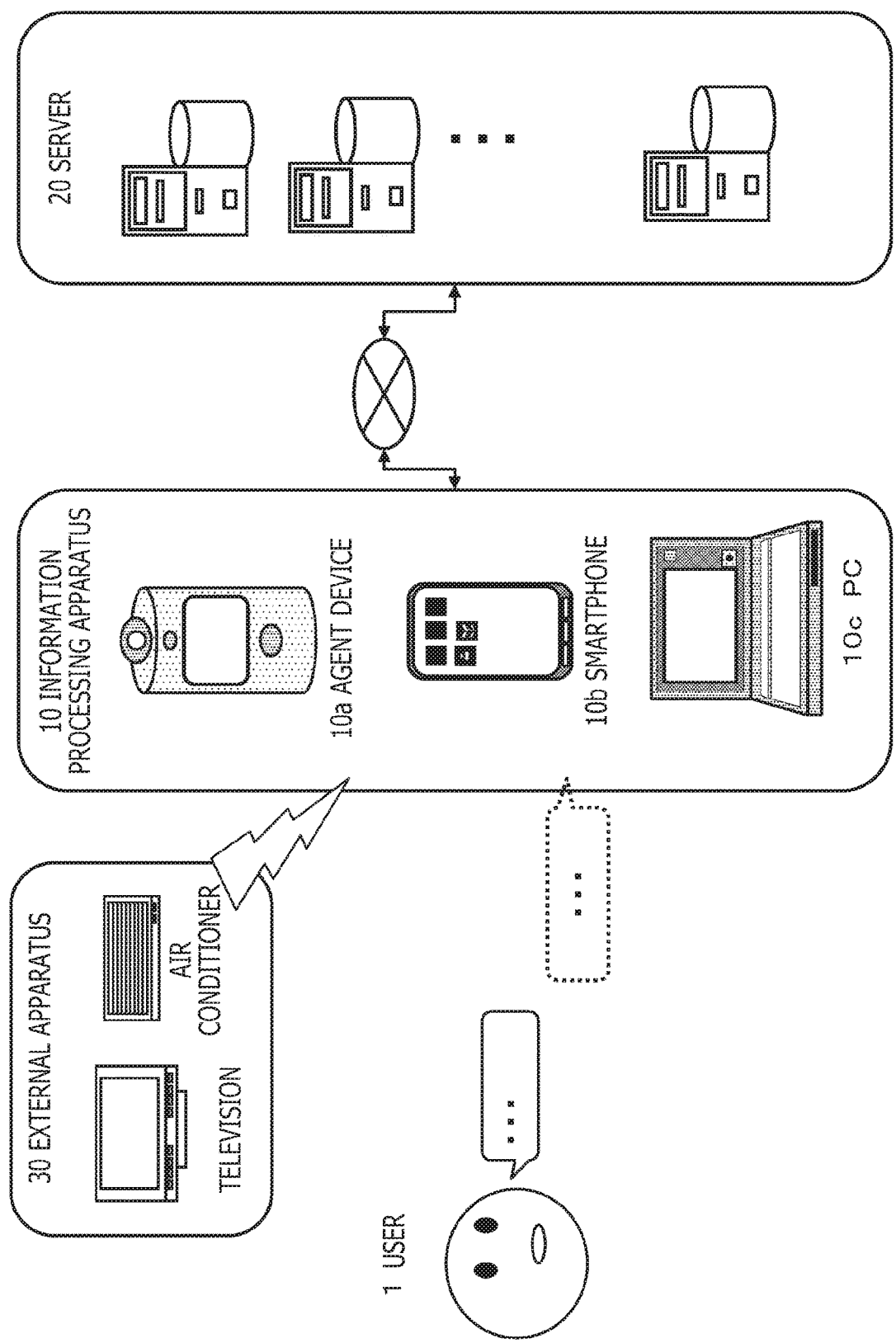

FIG. 3

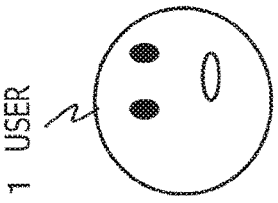

10 INFORMATION PROCESSING APPARATUS

USER SPEECH

SO1: KYO NO TENKI WA? (WHAT DOES THE WEATHER LOOK LIKE TODAY?)

SO3: TELL ME RECOMMENDED SPOTS.

SO5: HOW ABOUT TOKYO DISNEYLAND?

SO7: HOW ABOUT TOKYO SKYTREE?

SYSTEM SPEECH

SO2: KYOTO NO TENKI WA HARE DESU (IT IS SUPPOSED TO BE FINE IN KYOTO)

USER SPEECH IS MISRECOGNIZED AS "KYOTO NO TENKI WA? (WHAT DOES THE WEATHER LOOK LIKE IN KYOTO?)"

SO4: AN EVENT IS HELD IN KIYOMIZU-TEMPLE.

SO6: IT IS RELATIVELY UNCROWDED, TODAY.

SO8: IT IS CLOSED TODAY.

PRESENT SUBJECT OF CONVERSATION IS NOT KYOTO BUT TOKYO. IT IS DETERMINED THAT MISRECOGNITION HAS OCCURRED. THUS, LEARNING IS PERFORMED ON BASIS OF RE-RECOGNITION RESULT.

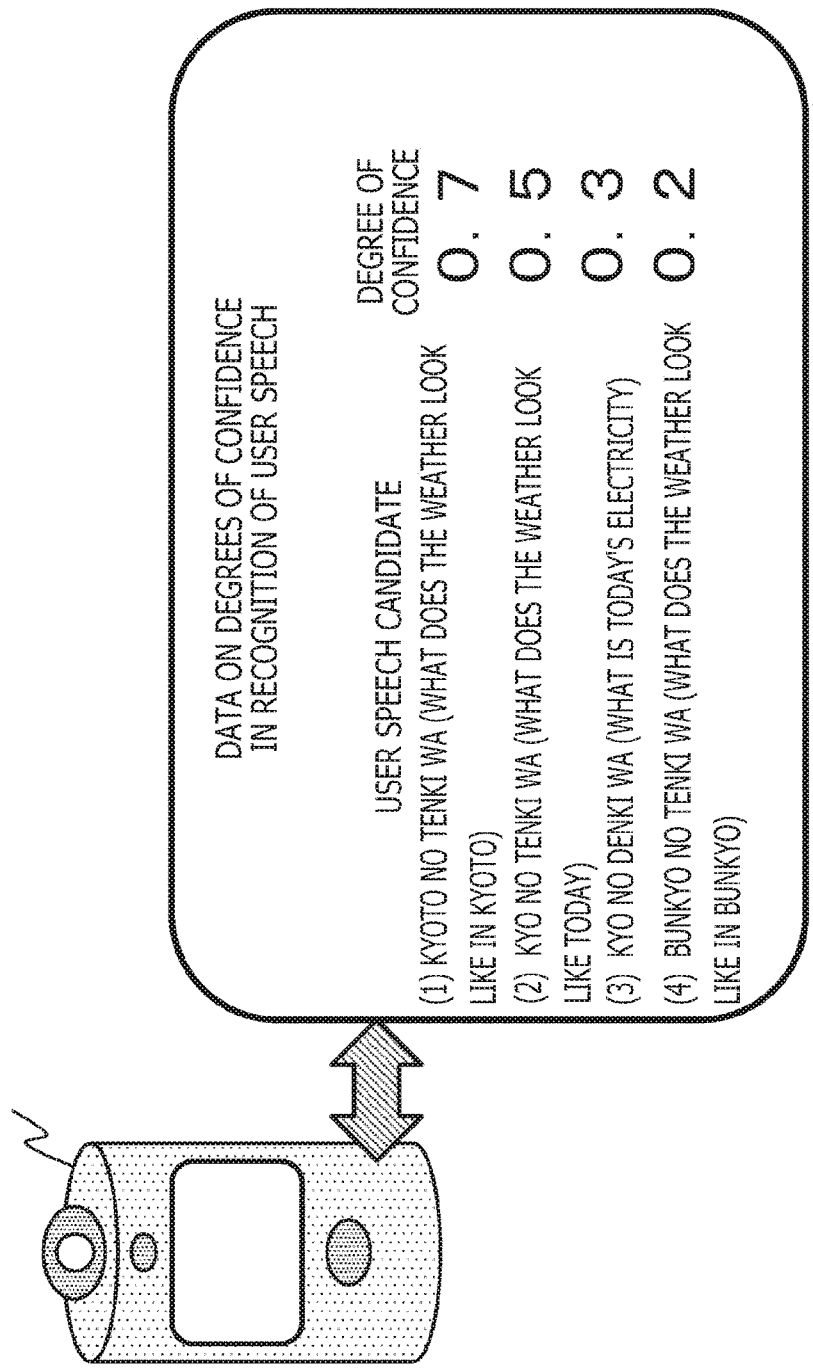
F I G . 4

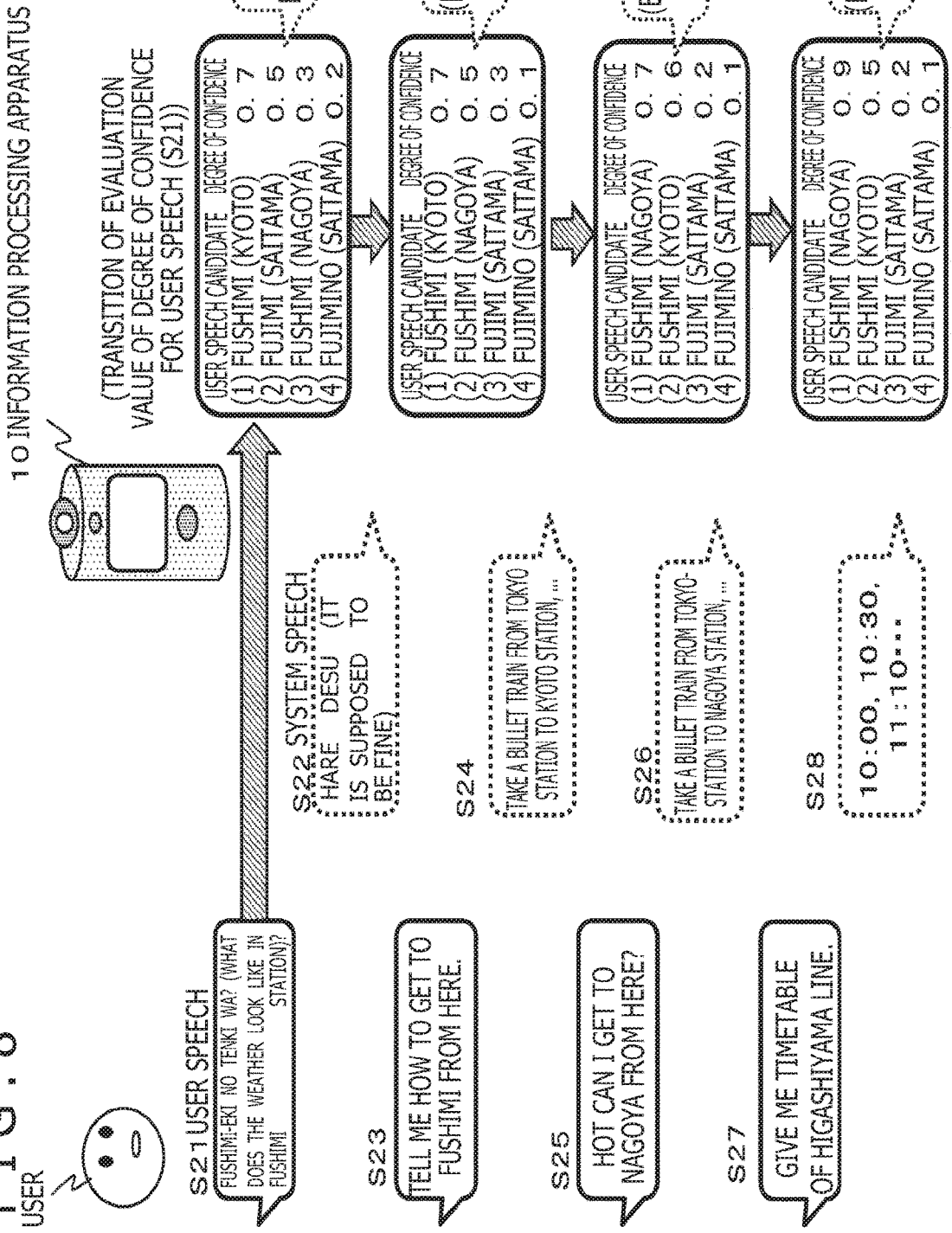

FIG. 9

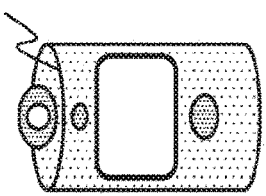

10 INFORMATION PROCESSING APPARATUS

SYSTEM SPEECH

S52 WHICH TIME DO YOU WANT TO CHECK AVAILABILITY OF RESERVATION?

S54 RESERVATION IS AVAILABLE AT ONE O'CLOCK (ICHI-JI).

S56 YOU CAN CHOOSE LUNCH A OR LUNCH B.

S58 YOU CAN CHOOSE COURSE A, COURSE B, OR COURSE C. COURSE C IS RECOMMENDED.

S60 RESERVATION AT 19:00 IS MADE.

USER SPEECH

S51 I WANT TO MAKE RESERVATION WITH RESTAURANT A.

S53 AVAILABILITY OF RESERVATION AT SEVEN O'CLOCK (SHICHI-JI).

S55 WHAT MENU DO THEY HAVE?

S57 WHAT ABOUT THE MENU FOR DINNER?

S59 MAKE RESERVATION FOR COURSE C AT 19:00.

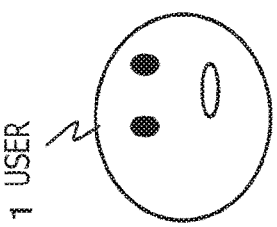

1 USER

FIG. 10

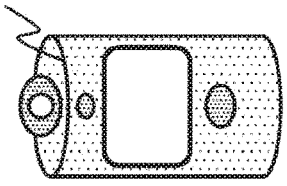
10 INFORMATION PROCESSING APPARATUS

SYSTEM SPEECH

S72 IT'S FEBRUARY 20. (MEIJI UNIVERSITY (MEIDAI))

S74 IT IS THREE-MINUTE WALK FROM OCHANOMIZU STATION.

S76 THE EXAMINATION DATE IS FEBRUARY 10, AND MEIDAI IN NAGOYA IS FIVE-MINUTE WALK FROM NAGOYA-DAIGAKU STATION.

USER SPEECH

S71 WHEN IS DATE OF EXAMINATION FOR NAGOYA UNIVERSITY (MEIDAI)?

S73 TELL ME HOW TO GET THERE.

S75 HOW ABOUT MEIDAI IN NAGOYA?

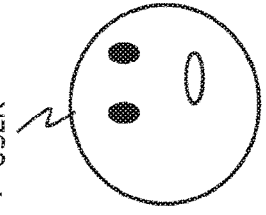
1 USER

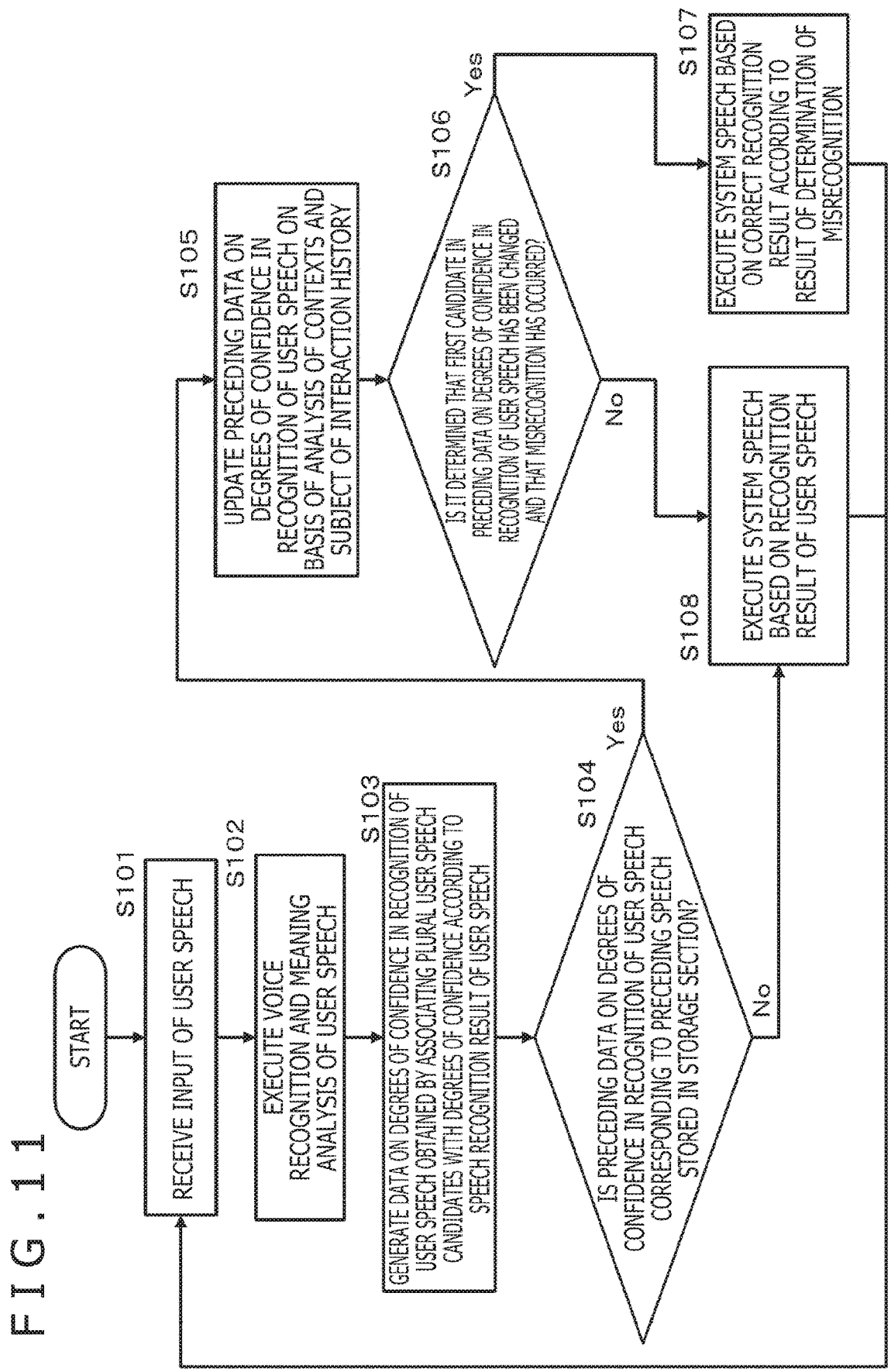

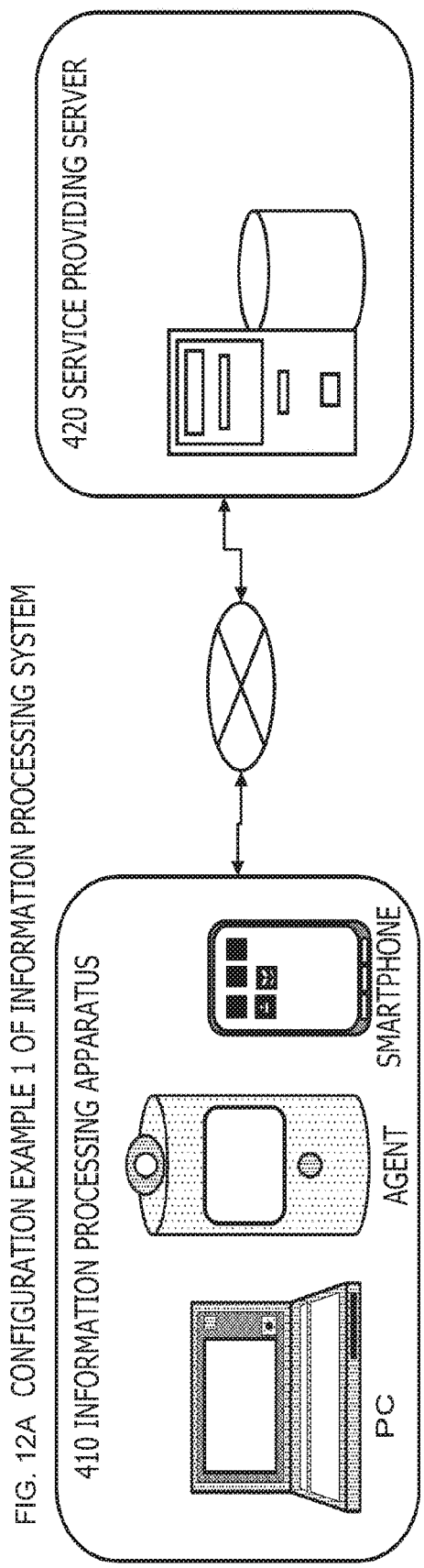
FIG. 12A CONFIGURATION EXAMPLE 1 OF INFORMATION PROCESSING SYSTEM
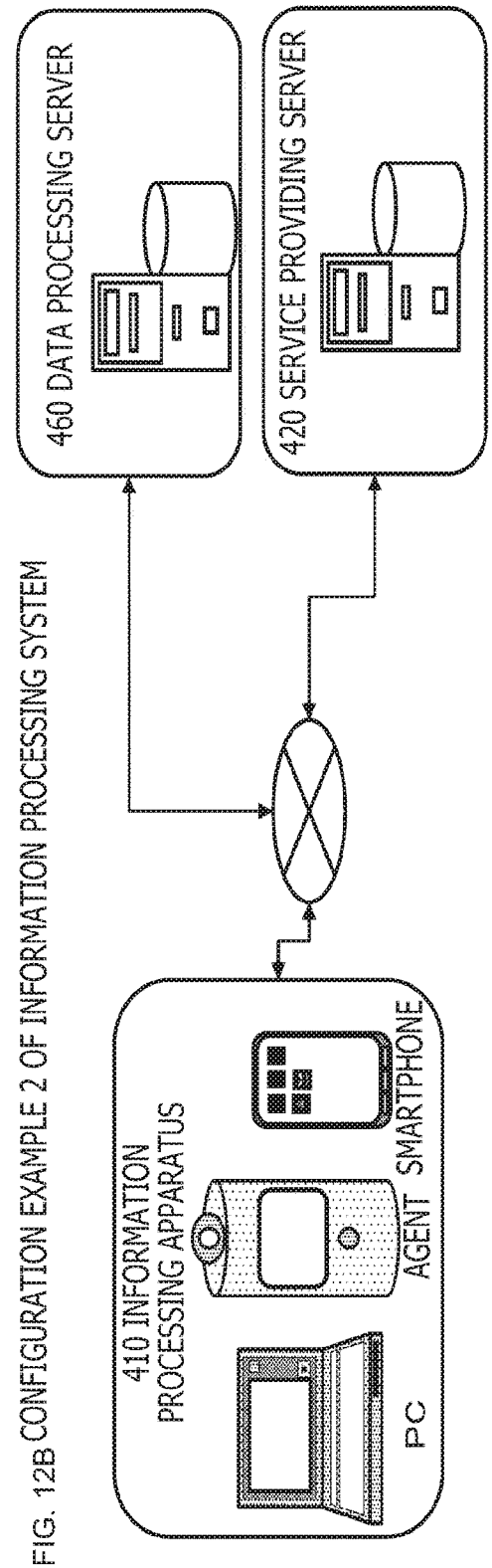
FIG. 12B CONFIGURATION EXAMPLE 2 OF INFORMATION PROCESSING SYSTEM

INFORMATION PROCESSING APPARATUS, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2018/044016 filed on Nov. 29, 2018, which claims priority benefit of Japanese Patent Application No. JP 2018-027507 filed in the Japan Patent Office on Feb. 20, 2018. Each of the above-referenced applications is hereby incorporated herein by reference in its entirety.

TECHNICAL FIELD

The present disclosure relates to an information processing apparatus, an information processing system, an information processing method, and a program. More specifically, the present disclosure relates to an information processing apparatus, an information processing system, an information processing method, and a program for performing processing to handle misrecognition of a user speech.

BACKGROUND ART

In recent years, use of voice recognition systems that execute voice recognition of user speeches and that execute various processes and make various responses on the basis of the recognition results has become popular.

Such a voice recognition system analyzes a user speech inputted via a microphone and executes a process according to the analysis result.

For example, in a case where a user gives a speech, "what does the weather look like tomorrow," the system acquires weather information from a weather information providing server, generates a system response based on the acquired information, and outputs the generated response through a loudspeaker. Specifically, for example, a system speech to be outputted is as follows:

system speech="It is supposed to be fine tomorrow, but there may be rain showers in the evening."

However, voice recognition systems do not always accurately recognize user speeches in whole and sometimes generate misrecognition.

When a system misrecognizes a user speech, the system may execute a process and make a response in a way that is different from what is required by a user.

For example, the following documents are disclosed as conventional technologies for handling misrecognition of user speeches.

PTL 1 (Japanese Patent Laid-Open No. 2011-158902) discloses a method for, in a case where a system side makes a mistake in a recognition result, allowing a user side to inform the system of the mistake in speech and making a correction at the system side according to this information.

In addition, PTL 2 (Japanese Patent Laid-Open No. 2006-146008) and PTL 3 (Japanese Patent Laid-Open No. 2014-48506) each disclose a configuration for preventing occurrence of misrecognition, by displaying plural candidate data sets obtained as voice recognition results on a screen and by allowing a user to select a data set corresponding to a user speech from among the displayed data sets.

In each of these conventional technologies, a certain user operation is needed to correct or decrease misrecognition. That is, a user needs to give a speech for making a request for correction of misrecognition, or an additional process by a user such as data selection by a user is needed.

With such setting, an interaction between the system and the user may be interrupted so that any smooth interaction is impossible. In addition, if the user fails to instantly perceive misrecognition, a timing for correcting the misrecognition may be missed.

CITATION LIST

Patent Literature

[PTL 1]
  Japanese Patent Laid-Open No. 2011-158902
[PTL 2]
  Japanese Patent Laid-Open No. 2006-146008
[PTL 3]
  Japanese Patent Laid-Open No. 2014-48506

SUMMARY

Technical Problems

The present disclosure has been made in view of the aforementioned problems, for example. An object of the present disclosure is to provide an information processing apparatus, an information processing system, an information processing method, and a program for enabling a system side to detect and handle misrecognition of a user speech without causing any burden on a user.

In one embodiment according to the present disclosure, in a case where misrecognition of a user speech occurs, the misrecognition is detected and handled by the apparatus side without requiring any special user operation or any special user speech with respect to the correction for such misrecognition.

Solution to Problems

A first aspect of the present disclosure is an information processing apparatus including
  a voice recognition section that executes a voice recognition process on a user speech, and
  a learning processing section that executes a process of updating a degree of confidence on the basis of an interaction made between a user and the information processing apparatus after the user speech, the degree of confidence being an evaluation value indicating reliability of a voice recognition result of the user speech.

Further, a second aspect of the present disclosure is an information processing system including
  a user terminal, and
  a data processing server, in which
  the user terminal includes
  a voice input section that inputs a user speech, and
  the data processing server includes
  a voice recognition section that executes a voice recognition process on the user speech received from the user terminal, and
  a learning processing section that executes a process of updating a degree of confidence on the basis of an interaction made between a user and an information processing apparatus after the user speech, the degree of confidence being an evaluation value indicating reliability of a voice recognition result of the user speech.

Further, a third aspect of the present disclosure is an information processing method which is executed by an information processing apparatus. The method includes a step of executing a voice recognition process on a user speech by means of a voice recognition section, and a step of executing, by means of a learning processing section, a process of updating a degree of confidence on the basis of an interaction made between a user and the information processing apparatus after the user speech, the degree of confidence being an evaluation value indicating reliability of a voice recognition result of the user speech.

Further, a fourth aspect of the present disclosure is an information processing method which is executed by an information processing system including a user terminal and a data processing server. The method includes executing, by means of the user terminal, a voice input process of inputting a user speech, and executing, by means of the data processing server, a voice recognition process on the user speech received from the user terminal, and a process of updating a degree of confidence on the basis of an interaction made between a user and an information processing apparatus after the user speech, the degree of confidence being an evaluation value indicating reliability of a voice recognition result of the user speech.

Furthermore, a fifth aspect of the present disclosure is a program for causing an information processing apparatus to execute information processing. The program is configured to cause a voice recognition section to execute a voice recognition process on a user speech, and cause a learning processing section to execute a process of updating a degree of confidence on the basis of an interaction made between a user and the information processing apparatus after the user speech, the degree of confidence being an evaluation value indicating reliability of a voice recognition result of the user speech.

It is to be noted that a program according to the present disclosure can be provided by a recording medium or communication medium for providing the program in a computer readable format to an information processing apparatus or computer system that is capable of executing various program codes, for example. By providing such program in a computer readable format, processing according the program is executed on the information processing apparatus or the computer system.

Other objects, features, and advantages of the present disclosure will become apparent from the detailed description based on the embodiment and the attached drawings which are described below. Note that, in the present description, a system refers to a logical set structure including a plurality of devices, and the devices of the structure are not necessarily included in the same casing.

Advantageous Effects of Invention

According to one embodiment of the present disclosure, an apparatus and a method for detecting misrecognition of a user speech on the basis of a subsequent interaction are implemented.

Specifically, the apparatus includes, for example, a voice recognition section that executes a voice recognition process on a user speech and a learning processing section that executes a process of updating, on the basis of an interaction made between a user and the information processing apparatus after the user speech, the degree of confidence being an evaluation value indicating reliability of a voice recognition result of the user speech. The voice recognition section generates data on degrees of confidence in recognition of the user speech in which data plural user speech candidates based on the voice recognition result of the user speech are associated with degrees of confidence which are evaluation values each indicating reliability of the corresponding user speech candidate. The learning processing section updates degree-of-confidence values in the data on the degrees of confidence in recognition of the user speech, by analyzing context consistency or subject consistency in the interaction made between the user and the information processing apparatus after the user speech.

According to this configuration, an apparatus and a method for detecting misrecognition of a user speech on the basis of a subsequent interaction are implemented.

It is to be noted that the effects described in the present description are just examples, and thus, are not limited. In addition, another effect may additionally be provided.

BRIEF DESCRIPTION OF DRAWINGS

FIG. 1 is an explanatory diagram of an example of an information processing apparatus that makes a response and executes a process based on a user speech.

FIG. 2 is an explanatory diagram of a configuration and use example of an information processing apparatus.

FIG. 3 is an explanatory diagram of the outline of processing which is executed by the information processing apparatus.

FIG. 4 is an explanatory diagram of one example of data on degrees of confidence in recognition of a user speech, the data being generated by the information processing apparatus.

FIG. 8 is an explanatory diagram of a specific example of processing which is executed by the information processing apparatus.

FIG. 9 is an explanatory diagram of a specific example of processing which is executed by the information processing apparatus.

FIG. 10 is an explanatory diagram of a specific example of processing which is executed by the information processing apparatus.

FIG. 11 is a diagram depicting a flowchart indicating a sequence of processing which is executed by the information processing apparatus.

FIGS. 12A and 12B is an are explanatory diagrams of a configuration example of an information processing system.

DESCRIPTION OF EMBODIMENT

Figure 5:
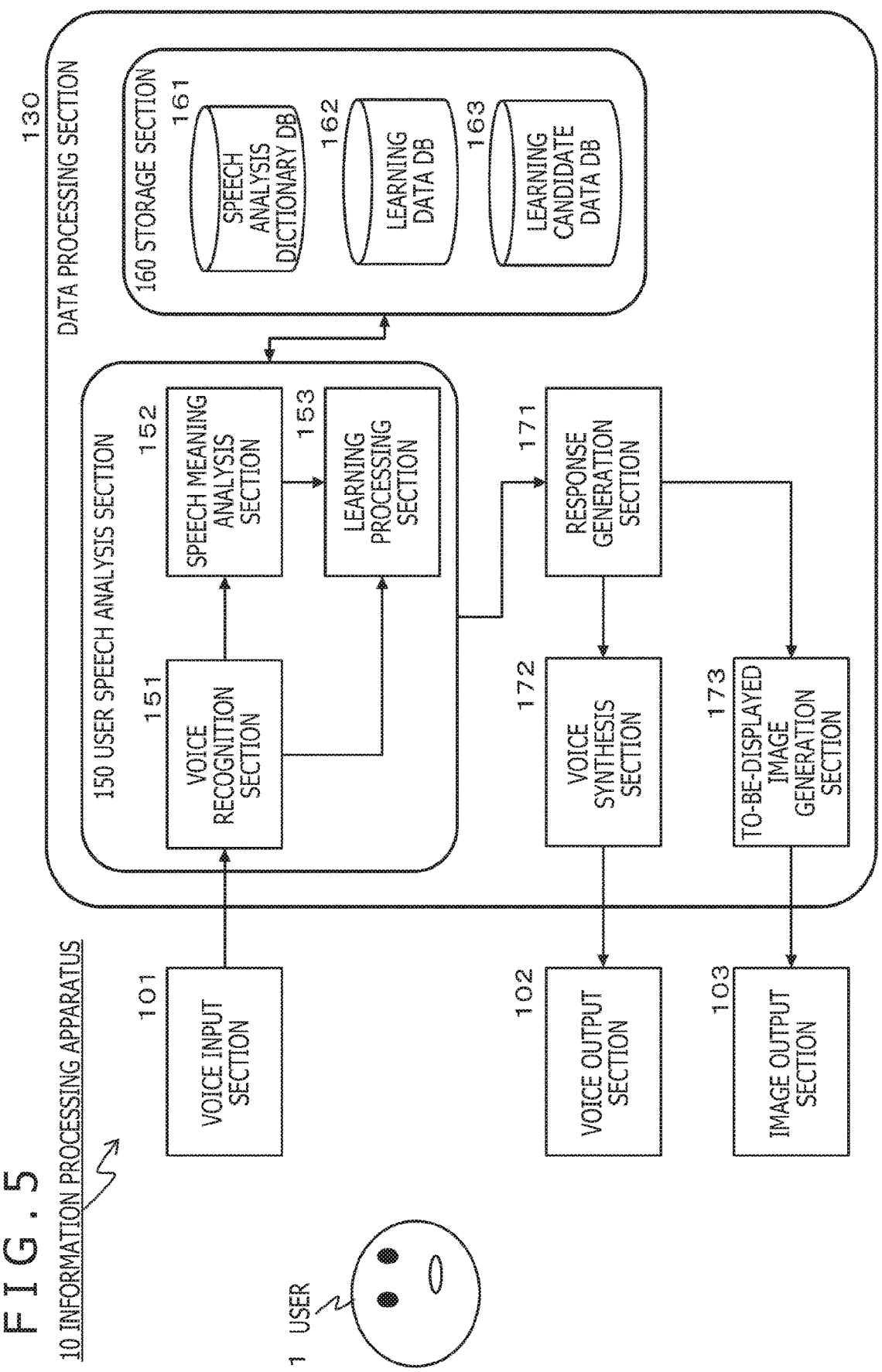
FIG. 5 is an explanatory diagram of a specific configuration example of the information processing apparatus.

An information processing apparatus, an information processing system, an information processing method, and a program according to the present disclosure will hereinafter be explained with reference to the drawings. It is to be noted that the explanations will be given in the following order.

1. Outline of processing which is executed by information processing apparatus
2. Configuration example of information processing apparatus
3. Details of processes of setting and updating the degrees of confidence of user speech candidates
4. Specific example of degree-of-confidence calculating process at learning processing section
5. Process examples for handling misrecognition regarding place, time, and community included in user speech
  5-1. (Process example 1) Process example for handling case where misrecognition has occurred regarding place
  5-2. (Process example 2) Process example for handling case where misrecognition has occurred regarding time
  5-3. (Process example 3) Process example for handling case where misrecognition has occurred regarding community
6. System speech which is made in case where occurrence of misrecognition is determined
7. Sequence of processing which is executed by information processing apparatus
8. Configuration example of information processing apparatus and information processing system
9. Hardware configuration example of information processing apparatus
10. Conclusion of configuration according to present disclosure

[1. Outline of Processing which is Executed by Information Processing Apparatus]

First, the outline of processing which is executed by an information processing apparatus according to the present disclosure will be explained with reference to FIG. 1 and subsequent drawings.

FIG. 1 is a diagram depicting one process example of an information processing apparatus 10 that recognizes a user speech made by a user 1 and makes a response.

For example, the information processing apparatus 10 executes a voice recognition process on a user speech:
user speech="What does the weather look like in Osaka tomorrow afternoon?"

Moreover, the information processing apparatus 10 executes a process based on the voice recognition result of the user speech.

In the example depicted in FIG. 1, data for responding to the user speech="What does the weather look like in Osaka tomorrow afternoon?" is acquired, a response is generated on the basis of the acquired data, and the generated response is outputted through a loudspeaker 14.

In the example depicted in FIG. 1, the information processing apparatus 10 gives the following system response:
system response="It is supposed to be fine tomorrow afternoon in Osaka, but there may be rain showers in the evening."

The information processing apparatus 10 executes voice synthesis (TTS: Text To Speech) to generate and output the above system response.

The information processing apparatus 10 generates a response by using knowledge data acquired from a storage section in the apparatus or knowledge data acquired over a network and outputs the response.

The information processing apparatus 10 depicted in FIG. 1 includes a microphone 12, a display section 13, and the loudspeaker 14 and has a configuration capable of inputting and outputting voices and inputting images.

The information processing apparatus 10 depicted in FIG. 1 is called a smart speaker or an agent device, for example.

It is to be noted that a voice recognition process and a meaning analysis process on a user speech may be executed in the information processing apparatus 10 or may be executed by a data processing server which is one of cloud-side servers 20.

The information processing apparatus 10 according to the present disclosure can have various apparatus forms including not only an agent device 10a but also a smartphone 10b and a PC 10c, as illustrated in FIG. 2.

The information processing apparatus 10 recognizes a speech given by the user 1 and makes a response based on the user speech, and further, for example, controls an external apparatus 30 such as a television or an air conditioner depicted in FIG. 2, according to the user speech.

For example, in a case where the user speech is a request such as "Change the TV channel to 1" or "Set the temperature of the air conditioner to 20 degrees," the information processing apparatus 10 outputs, on the basis of a voice recognition result of the user speech, a control signal (Wi-Fi, infrared rays, etc.) to the external apparatus 30, thereby performing control according to the user speech.

It is to be noted that the information processing apparatus 10 is connected to the server 20 over a network and can thus acquire, from the server 20, information that is necessary for generating a response to a user speech. In addition, as described above, a configuration for causing the server to execute the voice recognition process and the meaning analysis process may be adopted.

Next, the outline of processing which is executed by the information processing apparatus 10 according to the present disclosure will be explained with reference to FIG. 3.

The information processing apparatus 10 according to the present disclosure determines whether or not the information processing apparatus 10 itself has misrecognized a user speech, on the basis of an interaction sequence between a user and a system (the information processing apparatus 10).

In the case where occurrence of misrecognition is determined, a correct recognition result is derived, and the misrecognition is handled on the basis of the correct recognition result.

Moreover, the correct recognition result is stored as learning data, in a storage section, in association with data on the user speech.

That is, in the processing according to the present disclosure, in a case where misrecognition has occurred, the user does not point out the error and the information processing apparatus 10 itself detects the presence/absence of misrecognition during an interaction between the user and the information processing apparatus 10.

An explanation will be given of an interaction example between the user 1 and the information processing apparatus 10 according to the present disclosure, with reference to FIG. 3.

First, in step S01, the user 1 gives the following user speech:
user speech=Kyo no tenki wa (What does the weather look like today?).

In step S02, the information processing apparatus 10 having received this user speech gives, as a response to the user speech, the following system speech:
system speech=It is supposed to be fine in Kyoto.

This system speech is generated as a result of the information processing apparatus 10 misrecognizing the user speech in step S1 as "Kyoto no tenki wa (What does the weather look like in Kyoto?)."

Subsequently, in step S03, the user 1 gives the following user speech:
user speech=Tell me recommended spots.
In step S04, the information processing apparatus 10 having received this user speech gives, as a response to the user speech, the following system speech:
system speech=An event is held in Kiyomizu temple.
This system speech is generated on the basis of
a result obtained by the fact that the information processing apparatus 10 has misrecognized that the user speech in step S01="Kyoto no tenki wa (What does the weather look like in Kyoto?)," and
a result obtained by the fact that the information processing apparatus 10 has correctly recognized that the user speech in step S03="Tell me recommended spots."
Subsequently, in step S05, the user 1 gives the following user speech:
user speech=How about Tokyo Disneyland?
In step S06, the information processing apparatus 10 having received this user speech gives, as a response to the user speech, the following system speech:
system speech=It is relatively uncrowded, today.
This system speech is generated on the basis of the following results of recognition made by the information processing apparatus 10:
the result of misrecognizing that the user speech in step S01="Kyoto no tenki wa (What does the weather look like in Kyoto?)";
the result of correctly recognizing that the user speech in step S03="Tell me recommended spots"; and
the result of correctly recognizing that the user speech in step S05="How about Tokyo Disneyland?".
At this point of time, among
the user speech in step S01="Kyoto no tenki wa (What does the weather look like in Kyoto?),"
the user speech in step S03="Tell me recommended spots," and
the user speech in step S05="How about Tokyo Disneyland?"
there is a possibility that the information processing apparatus 10 has made an error in recognizing that
the user speech in step S01="Kyoto no tenki wa (What does the weather look like in Kyoto?)."
That is, the reliability of the preceding voice recognition process executed by the information processing apparatus 10 is determined to be low.
Thereafter, in step S07, the user 1 further gives the following user speech:
user speech=How about Tokyo SKYTREE?
In step S08, the information processing apparatus 10 having received this user speech gives, as a response to the user speech, the following system speech:
system speech=It is closed today.
This system speech is generated on the basis of the following results of recognition made by the information processing apparatus 10:
the result of misrecognizing that the user speech in step S01="Kyoto no tenki wa (What does the weather look like in Kyoto?)";
the result of correctly recognizing that the user speech in step S03="Tell me recommended spots";
the result of correctly recognizing that the user speech in step S05="How about Tokyo Disneyland?"; and
the result of correctly recognizing that the user speech in step S07="How about Tokyo SKYTREE?"

At this point of time, among
the user speech in step S01="Kyoto no tenki wa (What does the weather look like in Kyoto?),"
the user speech in step S03="Tell me recommended spots,"
the user speech in step S05="How about Tokyo Disneyland?" and
the user speech in step S07="How about Tokyo SKYTREE?" the information processing apparatus 10 has erred in recognizing the user speech as follows:
user speech in step S01="Kyoto no tenki wa (What does the weather look like in Kyoto?)." That is, occurrence of misrecognition is determined.
It is to be noted that, specifically, the information processing apparatus 10 generates, for example, data (data on degrees of confidence in recognition of the user speech), such as that depicted in FIG. 4, in which plural user speech candidates as candidates of the voice recognition result of the user speech are associated with degrees of confidence in recognition of the corresponding candidates, and executes a process of successively updating the "data on the degrees of confidence in recognition of the user speech" in accordance with the progress of an interaction between the user and the information processing apparatus.
By executing the process of updating the "data on the degrees of confidence in recognition of the user speech," the information processing apparatus 10 determines, as a final correct recognition result of the user speech, a user speech candidate remaining at a high rank.
Moreover, in the case where a correct recognition result of the user speech is obtained, the recognition result is recorded in a learning database, in association with the user speech data (voice waveform data).
The data recorded in the learning database is used for voice recognition and meaning analysis of subsequent user speeches. Accordingly, misrecognition is reduced.
Specific process examples will be explained below.

[2. Configuration Example of Information Processing Apparatus]

Next, a specific configuration example of the information processing apparatus will be explained with reference to FIG. 5.
FIG. 5 is a diagram depicting one configuration example of the information processing apparatus 10 that recognizes a user speech and that executes a process and make a response to the user speech.
As depicted in FIG. 5, the information processing apparatus 10 includes a voice input section 101, a voice output section 102, an image output section 103, and a data processing section 130.
It is to be noted that the data processing section 130 may be formed in the information processing apparatus 10 or may be a data processing section in an external server, instead of being formed in the information processing apparatus 10. In the case where the server is used, the information processing apparatus 10 transmits data inputted from the voice input section 101 to the server over a network, receives a process result obtained by the data processing section 130 in the server, and outputs the result via the output section (the voice output section 102 or the image output section 103).
Next, components of the information processing apparatus 10 depicted in FIG. 5 will be explained.
The voice input section 101 is a microphone, for example, and corresponds to the microphone 12 of the information processing apparatus 10 depicted in FIG. 1.

The voice output section 102 corresponds to the loudspeaker 14 of the information processing apparatus 10 depicted in FIG. 1.

The image output section 103 corresponds to the display section 13 of the information processing apparatus 10 depicted in FIG. 1.

It is to be noted that the image output section 103 may be formed of a projector or the like, for example, or may be formed by using a display section of a television which is an external apparatus.

As described above, the data processing section 130 is formed in either the information processing apparatus 10 or a server that is capable of communicating with the information processing apparatus 10.

The data processing section 130 includes a user speech analysis section 150, a storage section 160, a response generation section 171, a voice synthesis section 172, and a to-be-displayed image generation section 173.

The user speech analysis section 150 includes a voice recognition section 151, a speech meaning analysis section 152, and a learning processing section 153.

The storage section 160 includes a speech analysis dictionary DB (database) 161, a learning data DB 162, and a learning candidate data DB 163.

Voice of a speech given by a user is inputted to the voice input section 101 which is a microphone or the like.

The voice input section (microphone) 101 inputs the inputted user speech voice to the voice recognition section 151 of the user speech analysis section 150.

The voice recognition section 151 has, for example, an ASR (Automatic Speech Recognition) function to convert voice data to text data composed of a plurality of words.

It is to be noted that the voice recognition section 151 of the information processing apparatus 10 according to the present disclosure creates plural user speech candidates as voice recognition results of the user speech, and further, sets the "degrees of confidence" which are evaluation values each indicating the reliability of the corresponding candidate. That is, the "data on the degrees of confidence in recognition of the user speech," which has been explained with reference to FIG. 4, is generated.

Details of processing using the "data on the degrees of confidence in recognition of the user speech" will be explained below.

The voice recognition result of the user speech generated by the voice recognition section 151 is inputted to the speech meaning analysis section 152 and the learning processing section 153.

The speech meaning analysis section 152 executes a speech meaning analysis process on the text data.

The speech meaning analysis section 152 has a natural language understanding function such as NLU (Natural Language Understanding), for example, to estimate, from the text data, the intent of the user speech or the entity which is a meaningful element (significant element) included in the speech.

In the process at the voice recognition section 151 and the process at the speech meaning analysis section 152, a knowledge dictionary stored in the speech analysis dictionary DB (database) 161 of the storage section 160 and learning data stored in the learning data DB 162 are used.

The speech analysis dictionary DB 161 stores dictionary data necessary for interpreting the meaning of text data corresponding to various user speeches.

For example, data that can be used for analysis processes such as morphological analysis, syntax analysis, and vowel analysis, and further, a general knowledge dictionary, a technical word dictionary, a similar pronunciation dictionary, an important word dictionary, etc. are included.

Data on the correspondence between user speeches (voice data) and meaning data indicating the contents of the speeches is recorded in the learning data DB 162. Further, context information indicating user information, etc. is also recorded.

The learning data is sequentially updated as a result of a user-speech learning process.

An explanation will be given of a specific example of a process which is executed by the speech meaning analysis section 152. For example, it is assumed that the following user speech is inputted:

user speech=What does the weather look like in Osaka tomorrow afternoon?

In this user speech, the intent is to know the weather, and the entity is the words: Osaka, tomorrow, and afternoon.

When the intent and the entity are correctly estimated and acquired from the user speech, the information processing apparatus 10 can execute a correct process on the user speech.

For example, in the above example, the information processing apparatus 10 can acquire the next day afternoon's weather forecast for Osaka and output the acquired weather forecast as a response.

User-speech analysis information obtained by the speech meaning analysis section 152 is outputted to the response generation section 171 and is further outputted to the learning processing section 153.

A process which is executed by the learning processing section 153 will be explained later.

The response generation section 171 generates information regarding a response to the user, on the basis of the user-speech analysis information obtained by the speech meaning analysis section 152.

The response information is formed of at least either a voice or an image.

The voice synthesis section 172 generates voice data based on voice information included in the response generated by the response generation section 171, and the generated response voice data is outputted via the voice output section 102 which is a loudspeaker or the like.

The to-be-displayed image generation section 173 generates image data based on image information included in the response generated by the response generation section 171, and the generated image data is outputted via the image output section 103 which is a display section or the like.

The to-be-displayed information generation section 173 displays text information regarding a system speech to the user as well as other provision information.

For example, in a case where the user gives a user speech asking to show a world map, a world map is displayed.

The world map can be acquired from a service providing server, for example.

It is to be noted that the information processing apparatus 10 further has a function of executing processes in response to user speeches.

For example, in a case where a user speech=Play music, or a user speech=Show me an interesting video is given, the information processing apparatus 10 executes a process in response to the user speech, that is, a process of playing music or a process of playing video.

The information processing apparatus 10 has a function of executing such various processes, which are not depicted in FIG. 5.

Next, an explanation will be given of a process which is executed by the learning processing section 153.

The learning processing section 153 receives the following pieces of data:

(1) the "data on the degrees of confidence in recognition of the user speech" in which plural user speech candidates, which are voice recognition results of the user speech generated by the voice recognition section 151, are associated with degrees of confidence; and (2) information regarding the analysis result of the user speech generated by the speech meaning analysis section 152.

The learning processing section 153 receives this data and this information and executes a learning process for acquiring a correct result of voice recognition of the user speech, the intention of the user, and the like.

The learning result is stored in the learning data DB 162.

The learning processing section 153 receives the "data on the degrees of confidence in recognition of the user speech," which is data on the correspondence between the plural user speech candidates and the degrees of confidence and is generated by the voice recognition section 151, as explained above with reference to FIG. 4, and stores the data in the learning candidate data DB 163.

Moreover, the learning processing section 153 sequentially updates the "data on the degrees of confidence in recognition of the user speech" stored in the learning candidate data DB 163, in accordance with the progress of the interaction between the user and the information processing apparatus.

An explanation will be given of an example of the data stored in the learning candidate data DB 163, with reference to FIG. 6.

Figure 6:
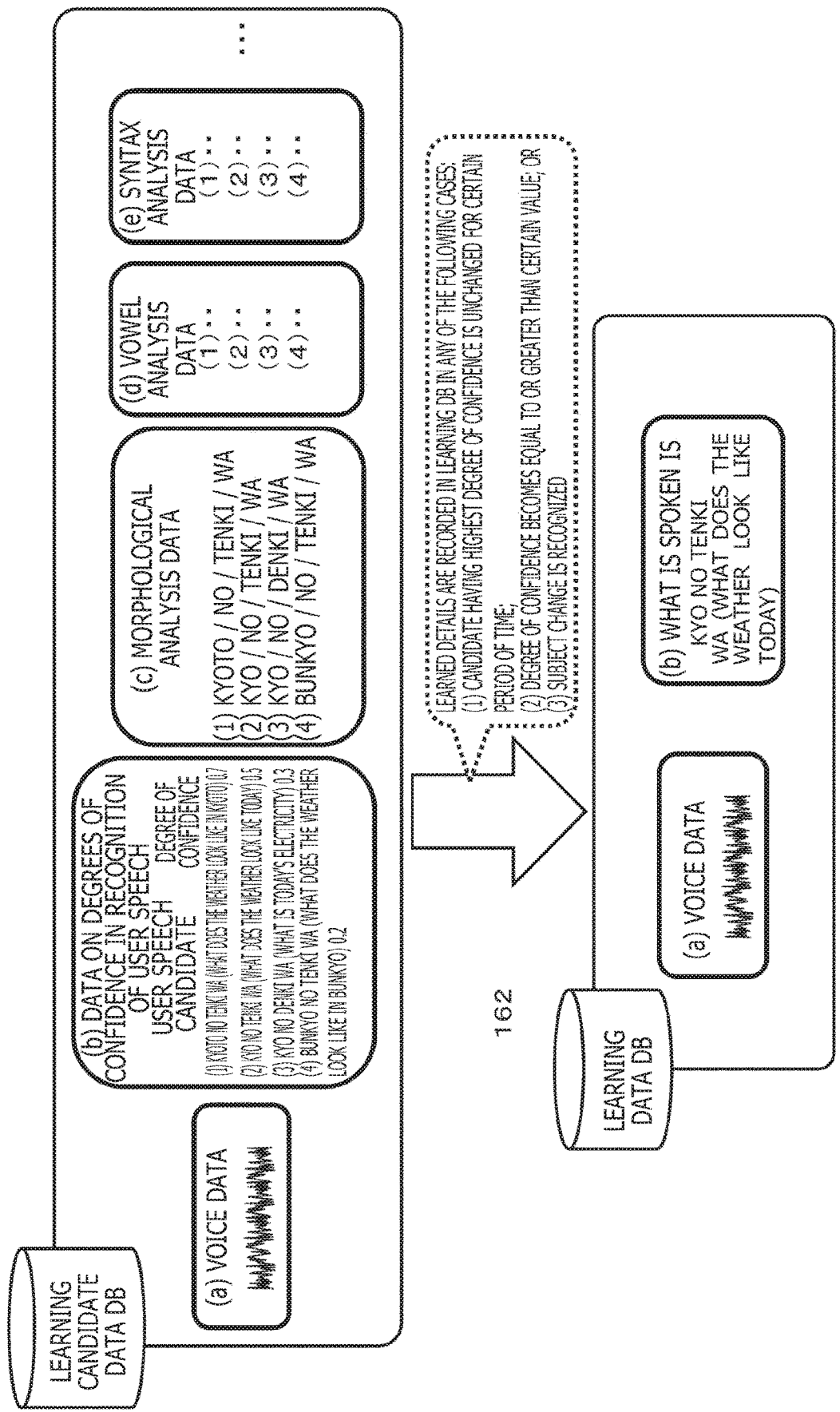
FIG. 6 is an explanatory diagram of one example of data stored in a storage section.

As depicted in FIG. 6, the learning processing section 153 records, in the learning candidate data DB 163, the following data sets in association with one another:

(a) voice data corresponding to the user speech;
(b) the "data on the degrees of confidence in recognition of the user speech";
(c) morphological analysis data on the user speech candidates;
(d) vowel analysis data on the user speech candidates; and
(e) syntax analysis data on the user speech candidates.

In FIG. 6, (b) "data on the degrees of confidence in recognition of the user speech" stored in the learning candidate data DB 163 corresponds to the example explained above with reference to FIGS. 3 and 4.

That is, the data (b) includes plural user speech candidates generated by the information processing apparatus 10 in response to the user speech in step S01 in FIG. 3: user speech=Kyo no tenki wa (What does the weather look like today?).

In the example depicted in FIG. 6, the following plural user speech candidates are illustrated:

(first candidate) Kyoto no tenki wa (What does the weather look like in Kyoto?);
(second candidate) Kyo no tenki wa (What does the weather look like today?);
(third candidate) Kyo no denki wa (What is today's electricity); and
(fourth candidate) Bunkyo no tenki wa (What does the weather look like in Bunkyo?).

These plural user speech candidates are candidate data generated by the voice recognition section 151 on the basis of the user speech.

In addition, the voice recognition section 151 sets, for the plural user speech candidates (1) to (4), respective degrees of confidence (initial values) in voice recognition. In the present example, the degree of confidence ranges from 1.0 to 0.0; the highest degree of confidence is 1.0, and the lowest degree of confidence is 0.0.

In a case where the reliability of voice recognition of the user speech is high, the voice recognition section 151 sets a high degree of confidence; in a case where the reliability of voice recognition of the user speech is low, the voice recognition section 151 sets a low degree of confidence.

Specifically, for example, in a case where the user speech includes a word, such as "kyo (today)" or "Kyoto," which is difficult to identify, the degrees of confidence of the speech candidates for this word are set to be low.

The learning processing section 153 receives the "data on the degrees of confidence in recognition of the user speech" generated by the voice recognition section 151 to indicate data on the correspondence between the plural user speech candidates and the degrees of confidence, as explained above with reference to FIG. 4, and stores the data in the learning candidate data DB 163.

The learning processing section 153 executes a process of updating, in accordance with the progress of the interaction between the user and the information processing apparatus, the degree-of-confidence values in the "data on the degrees of confidence in recognition of the user speech" stored in the learning candidate data DB 163.

As a result of the process of updating the "data on the degrees of confidence in recognition of the user speech," the learning processing section 153 determines that a user speech candidate remaining at the highest rank is a final correct user-speech recognition result.

In addition, when the correct user-speech recognition result is obtained, the recognition result is recorded in the learning data DB 162, in association with the user speech data (voice waveform data).

As depicted in FIG. 6, (a) voice data corresponding to the user speech, and
(b) what is spoken in the user speech are stored in association with each other in the learning data DB 162.

The data recorded in the learning data DB 162 is used for voice recognition and meaning interruption of a subsequent user speech. Accordingly, misrecognition is reduced.

As described above, the learning processing section 153 executes the process of updating the "data on the degrees of confidence in recognition of the user speech" stored in the learning candidate data DB 163.

The process of updating the degrees of confidence is executed in accordance with the progress of the interaction between the user and the information processing apparatus.

For example, by executing context analysis or subject analysis on a series of user speeches, the learning processing section 153 determines whether or not a context or subject that is consistent with a user speech recognition result obtained by the information processing apparatus is continuously present.

For example, in a case where the consistency is determined to be high, the possibility that the voice recognition result obtained by the voice recognition section 151 of the information processing apparatus 10 is correct is determined to be high. Then, the updating process of further raising the degree-of-confidence value of the (first candidate) which is recorded at the highest rank in the "data on the degrees of confidence in recognition of the user speech" and lowering the degree-of-confidence values of the remaining candidates is executed.

On the other hand, in a case where the consistency is determined to be low, the voice recognition result obtained by the voice recognition section 151 of the information processing apparatus 10 is determined to be possibly incorrect. Then, the degree-of-confidence value of the (first candidate) which is recorded at the highest rank in the "data on the degrees of confidence in recognition of the user speech" is lowered, and the degree-of-confidence values of the remaining candidates are also changed. For example, the updating process of raising the degree of confidence of a candidate that is determined to be consistent with the context or subject of the series of user speeches is executed.

The learning processing section 153 sequentially updates the degrees of confidence of, for example, the following plural user speech candidates stored in the learning candidate data DB 163:

(first candidate) Kyoto no tenki wa (What does the weather look like in Kyoto);

(second candidate) Kyo no tenki wa (What does the weather look like today);

(third candidate) Kyo no denki wa (What is today's electricity); and (fourth candidate) Bunkyo no tenki wa (What does the weather look like in Bunkyo). However, the updating process is halted at a certain point of time. After the updating process is halted, a process of storing the data in the learning data DB 162 is executed.

As indicated in FIG. 6, the timing for halting the degree-of-confidence updating process and storing the data in the learning data DB 162 is any one of the following timings:

(1) when the user speech candidate at the highest degree-of-confidence rank (first candidate) is unchanged for a certain period of time;

(2) when the degree of confidence of the user speech candidate at the highest rank (first candidate) becomes equal to or greater than a threshold specified in advance; and (3) when a subject change in user speeches is recognized.

In a case where any one of the events (1) to (3) above has occurred, the learning processing section 153 halts updating of the data on the degrees of confidence of the plural user speech candidates stored in the learning candidate data DB 163.

Moreover, a process of storing, in the learning data DB 162, data on the (first candidate) recorded at the highest rank in the "data on the degrees of confidence in recognition of the user speech" is executed.

As depicted in FIG. 6, the following pieces of data are stored in association with each other in the learning data DB 162:

(a) voice data corresponding to the user speech; and (b) what is spoken in the user speech.

Represented by "(b) What is spoken in the user speech" is data on the (first candidate) recorded at the highest rank in the "data on the degrees of confidence in recognition of the user speech."

It is to be noted that the learning processing section 153 may be configured to, in the process of generating and recording new learning data, also create update data for the similar pronunciation dictionary DB and the important word dictionary DB stored in the speech analysis dictionary DB 161 and record the update data in the speech analysis dictionary DB 161.

The learning process at the learning processing section 153 is executed while the interaction between the user and the information processing apparatus is ongoing. During this process, a correct recognition result of a correct speech of the misrecognized user speech is sometimes clarified.

In such case, the learning processing section 153 of the information processing apparatus 10 requests the response generation section 171 to create and output a system speech including a correction, for a conversation part influenced by the misrecognized part.

The response generation section 171 generates and outputs a system speech according to the request.

There are plural variations for the system speech including a correction. For example, the variations include the following:

(1) correcting an erroneous part;

(2) making a correction only to a speech having a high conversation importance which is calculated from important words;

(3) presenting an erroneous part to the user to ask the user to make an inquiry again;

(4) reporting only occurrence of an error; and (5) tracing back all the conversations and giving speeches again on the basis of a corrected part.

Any one of the variations may be set by the user or may be selected by the learning processing section 153 or the response generation section 171 on the basis of its own decision.

[3. Details of Processes of Setting and Updating the Degrees of Confidence of User Speech Candidates]

Next, an explanation will be given of a specific example in which the voice recognition section 151 and the learning processing section 153 of the user speech analysis section 150 execute processes of setting and updating the degrees of confidence of respective user speech candidates.

The user speech analysis section 150 of the information processing apparatus 10 analyzes what is spoken in a user speech, and creates candidates of spoken words.

Among the candidates, a candidate having the highest degree of confidence is determined as what was spoken in the speech, and a system response is generated on the basis of the determination.

As described above, in the configuration according to the present disclosure, the voice recognition section 151 of the user speech analysis section 150 generates plural user speech candidates for one user speech and performs initial setting of the degrees of confidence of the respective candidates. That is, the "data on the degrees of confidence in recognition of the user speech" explained above with reference to FIG. 4 is generated.

Thereafter, the learning processing section 153 updates the degrees of confidence of the respective candidates recorded in the "data on the degrees of confidence in recognition of the user speech," in accordance with the progress of the interaction with the user and on the basis of the context or subject consistency.

Figure 7:
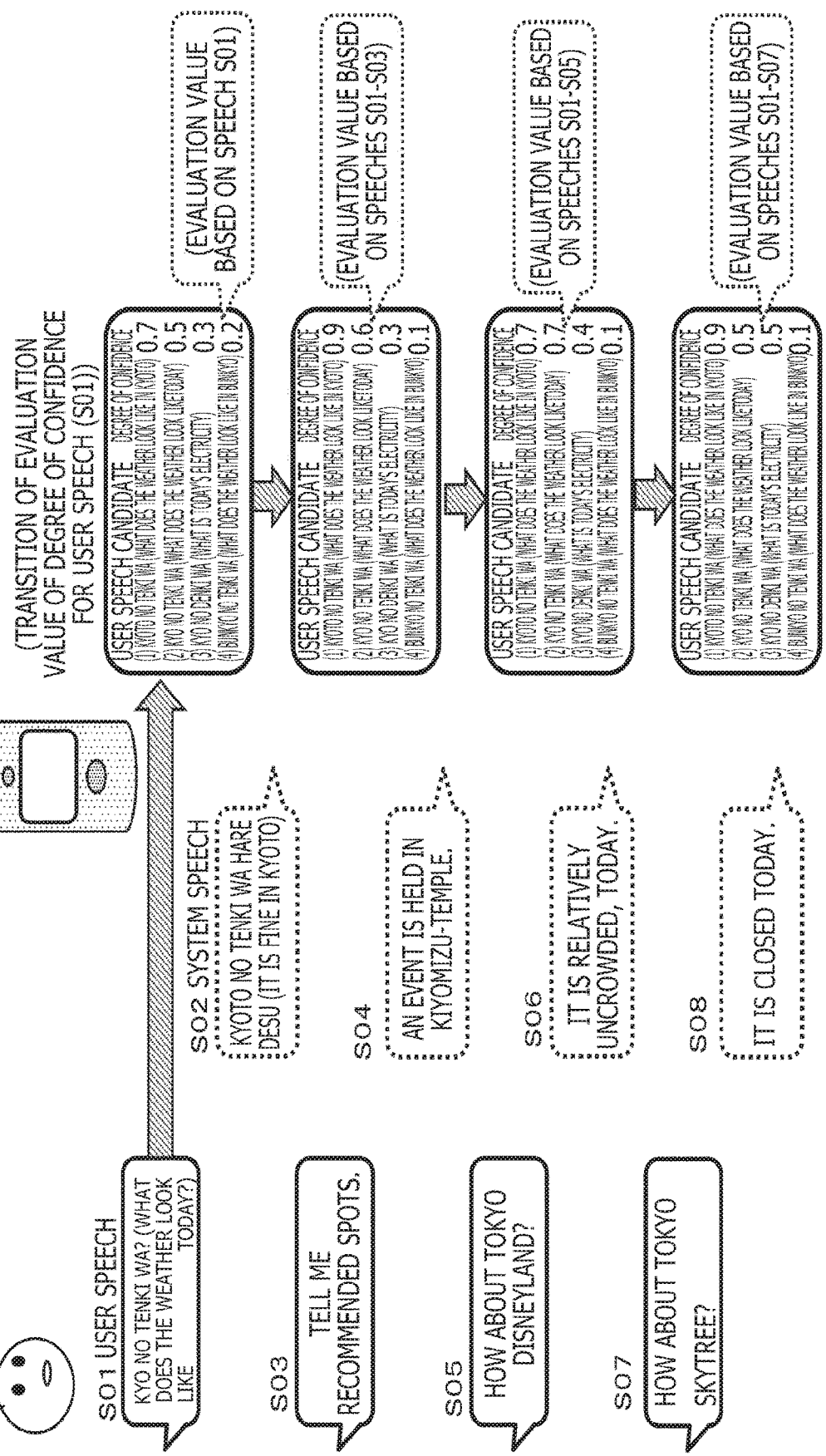
FIG. 7 is an explanatory diagram of a specific example of processing which is executed by the information processing apparatus.

With reference to FIG. 7, an explanation will be given of a specific example of the process, which is executed by the learning processing section 153, of updating the "data on the degrees of confidence in recognition of the user speech" stored in the learning candidate data DB 163.

FIG. 7 depicts an interaction example similar to the example of the interaction between the user and the system (information processing apparatus), which has been explained above with reference to FIG. 3.

First, in step S01, the user 1 gives the following user speech:

user speech=Kyo no tenki wa (What does the weather look like today?).

The information processing apparatus 10 having received this user speech executes the voice recognition process at the voice recognition section 151 of the user speech analysis section 150, sets plural candidates which are each presumed as the user speech, i.e., user speech candidates, and further, sets, for each of the candidates, the degree of confidence (initial value) based on the consistency with the voice recognition result. That is, "data on the degrees of confidence in recognition of the user speech" is generated.

FIG. 7 depicts an example of the "data on the degrees of confidence in recognition of the user speech" in which the plural user speech candidates and the degrees of confidence (initial values) are set as follows:

(first candidate) Kyoto no tenki wa (What does the weather look like in Kyoto)=the degree of confidence (0.7);

(second candidate) Kyo no tenki wa (What does the weather look like today)=the degree of confidence (0.5);

(third candidate) Kyo no denki wa (What is today's electricity)=the degree of confidence (0.3); and (fourth candidate) Bunkyo no tenki wa (What does the weather look like in Bunkyo)=the degree of confidence (0.2).

These plural user speech candidates are generated by the voice recognition section 151 on the basis of the user speech in step S01 alone.

It is to be noted that, in this example, the degree of confidence ranges from 1.0 to 0.0; the highest degree of confidence is 1.0, and the lowest degree of confidence is 0.0.

The "data on the degrees of confidence in recognition of the user speech" generated by the voice recognition section 151 is inputted from the voice recognition section 151 to the learning processing section 153 and is stored in the learning candidate data DB 163.

Moreover, the learning processing section 153 executes the process of updating the degrees of confidence in accordance with the progress of a subsequent interaction between the user and the information processing apparatus 10.

As a result of the voice recognition process at the voice recognition section 151, the possibility that the user speech in step S01 is (first candidate) Kyoto no tenki wa (What does the weather look like in Kyoto)=the degree of confidence (0.7) is determined to be the highest. On the basis of this determination result, the information processing apparatus 10 gives, in step S02, the following system speech:

system speech=It is supposed to be fine in Kyoto.

This system speech is based on the result obtained as a result of the information processing apparatus 10 recognizing the user speech in step S01 as "Kyoto no tenki wa (What does the weather look like in Kyoto?)."

Then, in step S03, the user 1 gives the following user speech:

user speech=Tell me recommended spots.

The learning processing section 153 of the information processing apparatus 10 having received this user speech updates the "data on the degrees of confidence in recognition of the user speech" stored in the learning candidate data DB 163.

The learning processing section 153 analyzes at least the context consistency or subject consistency in the interactions made between the user and the apparatus in steps S01 to S03.

The learning processing section 153 executes, for example, context analysis or subject analysis of a series of the interactions made between the user and the information processing apparatus after step S01 and determines whether or not a context and a subject that are consistent with the recognition result of the user speech in step S01 previously obtained by the information processing apparatus are continuously present.

For example, in a case where the consistency is determined to be high, the possibility that the (first candidate) in the "data on the degrees of confidence in recognition of the user speech" stored in the learning candidate data DB 163 is a correct result is determined to be high. Then, the degree-of-confidence value of the (first candidate) is raised, and the values of the remaining candidates are updated according to the similarities to the words constituting the (first candidate).

On the other hand, in a case where the consistency is determined to be low, the possibility that the (first candidate) in the "data on the degrees of confidence in recognition of the user speech" stored in the learning candidate data DB 163 has been misrecognized is determined to be high. Then, the degree-of-confidence value of the (first candidate) is lowered, and the values of the remaining candidates are updated according to the similarities to the words constituting the (first candidate).

In the example in FIG. 7, the learning processing section 153 determines that the context consistency and subject consistency in the interactions made between the user and the apparatus in steps S01 to S03 are high.

As a result, the possibility that the (first candidate) in the "data on the degrees of confidence in recognition of the user speech" stored in the learning candidate data DB 163 is a correct result is determined to be high, the degree-of-confidence value of the (first candidate) is raised, and the values of the remaining candidates are updated according to the similarities to the words constituting the (first candidate).

In the example in FIG. 7, the learning processing section 153 updates, on the basis of the interactions made between the user and the apparatus in steps S01 to S03, the degrees of confidence of the respective candidates in the "data on the degrees of confidence in recognition of the user speech" stored in the learning candidate data DB 163, as follows:

(first candidate) Kyoto no tenki wa (What does the weather look like in Kyoto)=the degree of confidence (0.9);

(second candidate) Kyo no tenki wa (What does the weather look like today)=the degree of confidence (0.6);

(third candidate) Kyo no denki wa (What is today's electricity)=the degree of confidence (0.3); and (fourth candidate) Bunkyo no tenki wa (What does the weather look like in Bunkyo)=the degree of confidence (0.1).

In step S04, the information processing apparatus 10 gives, as a response to the user speech, the following system speech:

system speech=An event is held in Kiyomizu temple.

This system speech is generated on the basis of the following results of recognition made by the information processing apparatus 10:

the result of recognizing that the user speech in step S01="Kyoto no tenki wa (What does the weather look like in Kyoto?)"; and the result of recognizing that the user speech in step S03="Tell me recommended spots."

At this point of time, a determination that the user speech in step S01="Kyoto no tenki wa (What does the weather look like in Kyoto?)" is misrecognition is not made at all.

Then, in step S05, the user 1 gives the following user speech:

user speech=How about Tokyo Disneyland?

The learning processing section 153 of the information processing apparatus 10 having received this user speech updates the "data on the degrees of confidence in recognition of the user speech" stored in the learning candidate data DB 163.

The learning processing section 153 analyzes the context consistency and subject consistency in the interactions made between the user and the apparatus in steps S01 to S05.

In the example depicted in FIG. 7, the learning processing section 153 determines that the context consistency and subject consistency in the interactions made between the user and the apparatus in steps S01 to S05 are low.

The reason for this is that the subject in steps S01 to S04 is Kyoto but the subject is changed to Tokyo in step S05.

As a result of this, the learning processing section 153 determines that the possibility that the (first candidate) in the "data on the degrees of confidence in recognition of the user speech" stored in the learning candidate data DB 163 is incorrect is high. Then, the degree-of-confidence value of the (first candidate) is lowered, and the values of the remaining candidates are updated according to the similarities to the words constituting the (first candidate).

In the example in FIG. 7, the learning processing section 153 updates, on the basis of the interactions made between the user and the apparatus in steps S01 to S05, the degrees of confidence of the respective candidates in the "data on the degrees of confidence in recognition of the user speech" stored in the learning candidate data DB 163, as follows:

(first candidate) Kyoto no tenki wa (What does the weather look like in Kyoto)=the degree of confidence (0.7);

(second candidate) Kyo no tenki wa (What does the weather look like today)=the degree of confidence (0.7);

(third candidate) Kyo no denki wa (What is today's electricity)=the degree of confidence (0.4); and (fourth candidate) Bunkyo no tenki wa (What does the weather look like in Bunkyo)=the degree of confidence (0.1).

Next, in step S06, the information processing apparatus 10 gives, as a response to the user speech, the following system speech:

system speech=It is relatively uncrowded, today.

This system speech is generated on the basis of the following results of recognition made by the information processing apparatus 10:

the result of recognizing that the user speech in step S01="Kyoto no tenki wa (What does the weather look like in Kyoto?)";

the result of recognizing that the user speech in step S03="Tell me recommended spots"; and the result of recognizing that the user speech in step S05="How about Tokyo Disneyland?"

At this point of time, the learning processing section 153 determines that there is a possibility that the recognition of the user speech in step S01="Kyoto no tenki wa (What does the weather look like in Kyoto?)" is misrecognition.

Then, in step S07, the user 1 further gives the following user speech:

user speech=How about Tokyo SKYTREE?

The learning processing section 153 of the information processing apparatus 10 having received this user speech updates the "data on the degrees of confidence in recognition of the user speech" stored in the learning candidate data DB 163.

The learning processing section 153 analyzes the context consistency and subject consistency in the interactions made between the user and the apparatus in steps S01 to S07.

In the example depicted in FIG. 7, the learning processing section 153 determines that the context consistency and subject consistency in the interactions made between the user and the apparatus in steps S01 to S07 are low.

The reason for this is that the subject in steps S01 to S04 is Kyoto but the subject in steps S05 and S07 is Tokyo.

As a result of this, the learning processing section 153 determines that the possibility that the (first candidate) in the "data on the degrees of confidence in recognition of the user speech" stored in the learning candidate data DB 163 is incorrect is high, and sets a user speech candidate that is determined to be most appropriate for increasing the context consistency and subject consistency in the interactions made between the user and the apparatus in steps S01 to S07, that is, "Kyo no tenki wa (What does the weather look like today?)," as the first candidate which has the highest degree of confidence. The values of the remaining candidates are updated according to the similarities to the words constituting the (first candidate).

In the example depicted in FIG. 7, the learning processing section 153 updates the degrees of confidence of the respective candidates in the "data on the degrees of confidence in recognition of the user speech" stored in the learning candidate data DB 163, on the basis of the interactions made between the user and the apparatus in steps S01 to S07, as follows:

(first candidate) Kyo no tenki wa (What does the weather look like today)=the degree of confidence (0.9);

(second candidate) Kyoto no tenki wa (What does the weather look like in Kyoto)=the degree of confidence (0.5);

(third candidate) Kyo no denki wa (What is today's electricity)=the degree of confidence (0.5); and (fourth candidate) Bunkyo no tenki wa (What does the weather look like in Bunkyo)=the degree of confidence (0.1).

Next, in step S08, the information processing apparatus 10 gives, as a response to the user speech, the following system speech:

system speech=It is closed today.

At the point of time of giving this system speech, the information processing apparatus 10 has determined that recognizing that the user speech in step S01="Kyoto no tenki wa (What does the weather look like in Kyoto?)" is misrecognition and has determined that recognizing that the user speech="Kyo no tenki wa (What does the weather look like today?)" is a correct recognition result.

At this point of time, the degree of confidence of the first candidate in the "data on the degrees of confidence in recognition of the user speech" stored in the learning candidate data DB 163 is 0.9. That is, (first candidate) Kyo no tenki wa (What does the weather look like today)=the degree of confidence (0.9).

For example, in a case where a threshold=0.9 or greater is set for the degree of confidence, the learning processing section 153 determines that this candidate is a correct recognition result. Then, data on the "(first candidate) Kyo no tenki wa (What does the weather look like today)" is stored in the learning data DB 162, in association with the user speech voice data.

That is, as explained above with reference to FIG. 6, the following pieces of data are recorded in association with each other in the learning data DB 162:

(a) voice data corresponding to the user speech; and (b) what is spoken in the user speech.

The data recorded in the learning data DB 162 is used for voice recognition and meaning interpretation of a subsequent user speech. Thus, misrecognition is reduced.

It is to be noted that setting for a process of calculating the degrees of confidence of the respective user speech candidates in the "data on the degrees of confidence in recognition of the user speech" can be performed in various ways. A specific example thereof is as follows.

For example, when the degree-of-confidence value is defined as f, the initial value obtained from a voice recognition result can be calculated as $$f=a$$

by directly using a voice-recognition reliability value score a.

Further, the degree-of-confidence value f updated afterwards by the learning processing section 153 on the basis of a subsequent interaction sequence can be calculated as $$f=a\times b$$

by using an evaluation score b indicating the context or subject consistency in plural consecutive interactions.

[4. Specific Example of Degree-of-Confidence Calculation Process at Learning Processing Section]

As explained above, when updating the degrees of confidence of the respective candidates in the "data on the degrees of confidence in recognition of the user speech" stored in the learning candidate data DB 163, the learning processing section 153 executes a process taking the context consistency and subject consistency in an interaction between the user and the apparatus into consideration.

A specific example of this process will be explained.

When analyzing the context of an interaction between the user and the apparatus, the learning processing section 153 calculates a vector indicating what is spoken in each of the speeches, by using results of morphological analysis and syntax analysis of the speeches, for example.

In the calculation of the vectors, preliminarily leaned data is used. When the speeches have a closer affinity, vectors calculated for the speeches have higher similarity.

When the similarity in vectors between the speeches is high, it is determined that interactions having context and subject consistency are established.

It is to be noted that words representing places, times, communities, and the like included in speeches are preferably set in such a manner as to have high influence on vector setting.

For example, regarding the user speech in step S01="Kyoto no tenki wa (What does the weather look like in Kyoto?)," and the user speech in step S05="How about Tokyo Disneyland?" in the example having been explained with reference to FIG. 7, the respective vectors indicating what are spoken in the above user speeches significantly differ from each other because the words "Kyoto" and "Tokyo" which are totally different from each other are included as place-representing words.

For example, in a case where totally different places "Kyoto" and "Tokyo" are included in a series of user speeches, as described above, the learning processing section 153 determines that the context or subject consistency is low.

That is, in the example depicted in FIG. 7, the possibility that the voice recognition result of the user speech in step S01="Kyoto no tenki wa (What does the weather look like in Kyoto?)" is misrecognition is determined to be high.

In this case, the learning processing section 153 executes the updating process to lower the degree of confidence of this user speech candidate included in the "data on the degrees of confidence in recognition of the user speech."

It is noted that more detailed setting is preferably performed for the vector calculating process and the degree-of-confidence updating process in a case where a place is included in a speech. For example, regarding the difference between "Shinagawa" and "Tokyo," the vectors of these places are set to have little difference from each other because Shinagawa is a part of Tokyo. That is, the similarity therebetween is determined to be high.

In addition, the vector of a system speech given by the information processing apparatus 10 may be compared with the vector of a subsequent interaction, and the speech consistency may be reflected in the degrees of confidence.

[5. Process Examples for Handling Misrecognition of Place, Time, and Community Included in User Speech]

Next, an explanation will be given of process examples for handling misrecognition of a place, a time, and a community included in a user speech.

In a case where a user speech includes a word representing a place, a time, a community, or the like and the user speech is misrecognized by the information processing apparatus, even when the information processing apparatus makes a response based on the misrecognition, a user may determine that the response is based on a result obtained by the fact that the information processing apparatus 10 has correctly recognized the user speech.

In such case, there is a possibility that incorrect information provided to the user is left unchanged.

Even in such case, that is, a case where the information processing apparatus 10 according to the present disclosure has made a response based on misrecognition, the information processing apparatus 10 automatically makes a correction such that the user finally acquires information requested by the user from the information processing apparatus 10.

Specific process examples will be explained below.

The following three process examples will be explained in order:

(Process example 1) a process example for handling a case where misrecognition has occurred regarding a place;

(Process example 2) a process example for handling a case where misrecognition has occurred regarding a time; and (Process example 3) a process example for handling a case where misrecognition has occurred regarding a community.

[5-1. (Process Example 1) Process Example for Handling Case where Misrecognition has Occurred Regarding Place]

First, as process example 1, a process example for handling a case where misrecognition has occurred regarding a place will be explained with reference to FIG. 8.

In Japan, some places have the same or similar names. FIG. 8 depicts an example in which a speech as to "Fushimi" is given. Examples of "Fushimi" include Fushimi of Kyoto and Fushimi of Nagoya. In the case where a word such as Kyoto or Nagoya is not included, it remains unclear for the information processing apparatus 10 to which Fushimi reference is made.

As depicted in FIG. 8, in step S21, the user 1 first gives the following user speech:

user speech=What does the weather look like in Fushimi station?

This user speech of the user 1 is an inquiry regarding the weather in Fushimi of Nagoya.

Meanwhile, the information processing apparatus 10 having received this user speech sets plural candidates which are each presumed as the user speech, that is, user speech candidates, by executing a voice recognition process at the voice recognition section 151 of the user speech analysis section 150, and further, sets, for each of the candidates, the degree of confidence (initial value) based on the consistency with the voice recognition result. That is, "data on the degrees of confidence in recognition of the user speech" is generated.

FIG. 8 depicts an example of the "data on the degrees of confidence in recognition of the user speech" in which the plural user speech candidates and the degrees of confidence (initial value) are set as follows:

(first candidate) Fushimi (Kyoto)=the degree of confidence (0.7);

(second candidate) Fujimi (Saitama)=the degree of confidence (0.5);

(third candidate) Fushimi (Nagoya)=the degree of confidence (0.3); and (fourth candidate) Fujimino=the degree of confidence (0.2).

It is to be noted that, here, only data on candidates of a word representing a place included in the user speech will be extracted and explained.

These plural user speech candidates are candidate data generated by the voice recognition section 151 on the basis of only the user speech in step S21.

It is to be noted that the degree of confidence ranges from 1.0 to 0.0 in the present example; the highest degree of confidence is 1.0, and the lowest degree of confidence is 0.0.

The "data on the degrees of confidence in recognition of the user speech" generated by the voice recognition section 151 is inputted from the voice recognition section 151 to the learning processing section 153 and is stored in the learning candidate data DB 163.

Further, the learning processing section 153 executes a process of updating the degrees of confidence in accordance with the progress of a subsequent interaction between the user and the information processing apparatus 10.

As a result of the voice recognition process at the voice recognition section 151, the possibility that the user speech in step S21 is (first candidate) Fushimi (Kyoto)=the degree of confidence (0.7)

is determined to be the highest. On the basis of this determination result, the information processing apparatus 10 gives, in step S22, the following system speech:

system speech=It is supposed to be fine.

This system speech is based on the result obtained by the fact that the information processing apparatus 10 has recognized the user speech in step S21 as "What does the weather look like in Fushimi station (Kyoto)?"

Subsequently, in step S23, the user 1 gives the following user speech:

user speech=Tell me how to get to Fushimi from here.

This user speech of the user 1 is an inquiry regarding the way to Fushimi of Nagoya.

The learning processing section 153 of the information processing apparatus 10 having received this user speech updates the "data on the degrees of confidence in recognition of the user speech" stored in the learning candidate data DB 163.

The learning processing section 153 analyzes the context consistency and subject consistency in interactions made between the user and the apparatus in steps S21 to S23.

For example, by executing context analysis and subject analysis of a series of user speeches, the learning processing section 153 determines whether or not the context and the subject that are consistent with the user speech recognition result obtained by the information processing apparatus are continuously present.

For example, in a case where the consistency is determined to be high, the possibility that the (first candidate) in the "data on the degrees of confidence in recognition of the user speech" stored in the learning candidate data DB 163 is a correct result is determined to be high. Then, the degree-of-confidence value of the (first candidate) is raised, and the values of the remaining candidates are updated according to the similarities to the words constituting the (first candidate).

On the other hand, in a case where the consistency is determined to be low, the possibility that the (first candidate) in the "data on the degrees of confidence in recognition of the user speech" stored in the learning candidate data DB 163 is misrecognition is determined to be high. Then, the degree-of-confidence value of the (first candidate) is lowered, and the values of the remaining candidates are updated according to the similarities to the words constituting the (first candidate).

In the example depicted in FIG. 8, the learning processing section 153 determines that the context consistency and subject consistency in interactions made between the user and the apparatus in steps S21 to S23 are high.

As a result, the possibility that the (first candidate) in the "data on the degrees of confidence in recognition of the user speech" stored in the learning candidate data DB 163 is a correct result is determined to be high. Then, the degree-of-confidence value of the (first candidate) is raised, and the values of the remaining candidates are updated according to the similarities to the words constituting the (first candidate).

In the example depicted in FIG. 8, the learning processing section 153 updates the degrees of confidence of the respective candidates in the "data on the degrees of confidence in recognition of the user speech" stored in the learning candidate data DB 163, on the basis of interactions made between the user and the apparatus in steps S21 to S23, as follows:

(first candidate) Fushimi (Kyoto)=the degree of confidence (0.7);

(second candidate) Fujimi (Saitama)=the degree of confidence (0.5);

(third candidate) Fushimi (Nagoya)=the degree of confidence (0.3); and (fourth candidate) Fujimino=the degree of confidence (0.1).

In step S24, the information processing apparatus 10 gives, as a response to the user speech, the following system speech:

system speech=Take a bullet train from Tokyo station to Kyoto station, . . . .

This system speech is generated on the basis of the following results of recognition made by the information processing apparatus 10:

the result of recognizing the user speech in step S21="What does the weather look like in the Fushimi station?" as "What does the weather look like in the Fushimi station in Kyoto?"; and the result of recognition of the user speech in step S23="Tell me how to get to Fushimi from here."

At this point of time, a determination that, in the process of recognizing the user speech in step S21="What does the weather look like in the Fushimi station?" misrecognition of the place has been made is not made at all.

Subsequently, in step S25, the user 1 gives the following user speech:

user speech=How can I get to Nagoya from here?

The learning processing section 153 of the information processing apparatus 10 having received this user speech updates the "data on the degrees of confidence in recognition of the user speech" stored in the learning candidate data DB 163.

The learning processing section 153 analyzes the context consistency and subject consistency in interactions made between the user and the apparatus in steps S21 to S25.

In the example depicted in FIG. 8, the learning processing section 153 determines that the context consistency and subject consistency in the interactions made between the user and the apparatus in steps S21 to S25 are low.

The reason for this is that the subject in steps S21 to S24 is Kyoto but the subject is changed to Nagoya in step S25.

As a result of this, the learning processing section 153 determines that the possibility that the (first candidate) in the "data on the degrees of confidence in recognition of the user speech" stored in the learning candidate data DB 163 is incorrect is high. Then, the degree-of-confidence value of the (first candidate) is lowered, and the values of the remaining candidates are updated according to the similarities to the words constituting the (first candidate).

In the example depicted in FIG. 8, the learning processing section 153 updates the degrees of confidence of the respective candidates in the "data on the degrees of confidence in recognition of the user speech" stored in the learning candidate data DB 163, on the basis of the interactions made between the user and the apparatus in steps S21 to S25, as follows:

(first candidate) Fushimi (Nagoya)=the degree of confidence (0.7);

(second candidate) Fushimi (Kyoto)=the degree of confidence (0.6);

(third candidate) Fujimi (Saitama)=the degree of confidence (0.2); and (fourth candidate) Fujimino=the degree of confidence (0.1).

Next, the information processing apparatus 10 gives, as a response to the user speech in step S26, the following system speech:

system speech=Take a bullet train from Tokyo station to Nagoya station, . . . .

This system speech is generated on the basis of the following results of recognition made by the information processing apparatus 10:

the result of re-recognizing that the user speech in step S21="What does the weather look like in the Fushimi station?" is about Fushimi station in Nagoya, on the basis of data on the "(first candidate) Fushimi (Nagoya)=the degree of confidence (0.7)" in the "data on the degrees of confidence in recognition of the user speech"; and the result of recognition of the user speech in step S25="How can I get to Nagoya from here?"

At this point of time, the learning processing section 153 has determined that there is a possibility of misrecognition of place with respect to the user speech in step S21="What does the weather look like in the Fushimi station?"

Subsequently, in step S27, the user 1 further gives the following user speech:

user speech=Give me the timetable of Higashiyama Line.

The learning processing section 153 of the information processing apparatus 10 having received this user speech updates the "data on the degrees of confidence in recognition of the user speech" stored in the learning candidate data DB 163.

The learning processing section 153 analyzes the context consistency and subject consistency in the user speech in step S21 and the user speech in step S27.

It is to be noted that, at this point of time, the user speech in step S21 has been recognized as the first candidate in the "data on the degrees of confidence in recognition of the user speech" stored in the learning candidate data DB 163, that is, (first candidate) Fushimi (Nagoya)=the degree of confidence (0.7).

In the example depicted in FIG. 8, the learning processing section 153 determines that the context consistency and subject consistency in the user speech in step S21 and the user speech in step S27 are high.

The reason for this is that both the subject in step S21 and the subject in step S27 are Fushimi of Nagoya.

As a result of this, the possibility that the (first candidate) in the "data on the degrees of confidence in recognition of the user speech" stored in the learning candidate data DB 163 is a correct result is determined to be high. Then, the degree-of-confidence value of the (first candidate) is raised, and the values of the remaining candidates are updated according to the similarities to the words constituting the (first candidate).

The learning processing section 153 updates the degrees of confidence of the respective candidates in the "data on the degrees of confidence in recognition of the user speech" stored in the learning candidate data DB 163, as follows:

(first candidate) Fushimi (Nagoya)=the degree of confidence (0.9);

(second candidate) Fushimi (Kyoto)=the degree of confidence (0.5);

(third candidate) Fujimi (Saitama)=the degree of confidence (0.2); and (fourth candidate) Fujimino=the degree of confidence (0.1).

Next, in step S28, the information processing apparatus 10 gives, as a response to the user speech, the following system speech:

system speech=10:00, 10:30, 11:10 . . . .

At the point of time of giving this system speech, the information processing apparatus 10 has re-recognized that user speech in step S21="What does the weather look like in the Fushimi station?" is meant as asking the weather in Fushimi station in Nagoya.

At this point of time, the degree of confidence of the first candidate in the "data on the degrees of confidence in recognition of the user speech" stored in the learning candidate data DB 163 is 0.9. That is, (first candidate) Fushimi (Kyoto)=the degree of confidence (0.9).

For example, in a case where a threshold=0.9 or greater is set for the degree of confidence, the learning processing section 153 determines that this candidate is a correct recognition result. Then, data on this candidate is stored in the learning data DB 162, in association with the user speech voice data.

That is, the following pieces of data are recorded in association with each other in the learning data DB 162, as explained above with reference to FIG. 6:

(a) voice data corresponding to the user speech; and (b) what is spoken in the user speech.

The data recorded in the learning data DB 162 is used for voice recognition and meaning interpretation of a subsequent user speech. Thus, misrecognition is reduced.

[5-2. (Process Example 2) Process Example for Handling Case where Misrecognition has Occurred Regarding Time]

Next, as process example 2, a process example for handling a case where misrecognition has occurred regarding a time will be explained with reference to FIG. 9.

Some time-related speeches, such as one o'clock (ichi-ji) and seven o'clock (shichi-ji), increase the possibility of occurrence of misrecognition. Even when such misrecognition is made in the information processing apparatus 10, a user may continue an interaction without being aware of the misrecognition.

As depicted in FIG. 9, in step S51, the user 1 first gives the following user speech:

user speech=I want to make a reservation with restaurant A.

In step S52, the information processing apparatus 10 gives the following system speech:

system speech=Which time do you want to check the availability of reservation?

Subsequently, in step S53, the user 1 gives the following user speech:

user speech=Availability of reservation at seven o'clock (shichi-ji).

The voice recognition section 151 of the information processing apparatus 10 having received this user speech generates "data on the degrees of confidence in recognition of the user speech" in which (first candidate) one o'clock (ichi-ji), and (second candidate) seven o'clock (shichi-ji), are recorded as user speech candidates obtained as a result of voice recognition.

It is to be noted that, here, only data on candidates of a time-representing word included in the user speech will be extracted and explained.

The learning processing section 153 stores, in the learning candidate data DB 163, the "data on the degrees of confidence in recognition of the user speech" generated by the voice recognition section 151.

In step S54, the information processing apparatus 10 gives, as a response to the user speech, the following system speech:

system speech=Reservation is available at one o'clock (ichi-ji).

This system speech is generated on the basis of the result obtained by the fact that the information processing apparatus 10 has misrecognized the user speech step S53="Availability of reservation at seven o'clock" as "Availability of reservation at one o'clock."

At this point of time, the information processing apparatus 10 has not determined that misrecognition has been made regarding the time, at all.

Subsequently, in step S55, the user 1 gives the following user speech:

user speech=What menu do they have?

Next, in step S56, the information processing apparatus 10 gives, as a response to the user speech, the following system speech:

system speech=You can choose lunch A or lunch B.

In this system speech, the result obtained by the fact that the information processing apparatus 10 has misrecognized the user speech in step S53="Availability of reservation at seven o'clock (shichi-ji)" as "Availability of reservation at one o'clock (ichi-ji)" is reflected.

Thereafter, in step S57, the user 1 further gives the following user speech:

user speech=What about the menu for dinner?

The learning processing section 153 of the information processing apparatus 10 having received this user speech updates the "data on the degrees of confidence in recognition of the user speech" stored in the learning candidate data DB 163.

The learning processing section 153 analyzes the context consistency and subject consistency in the recognition result of the user speech in step S53="Availability of reservation at one o'clock (ichi-ji)," and the recognition result of the user speech in step S57="What about the menu for dinner?"

In the example depicted in FIG. 9, the learning processing section 153 determines that the context consistency and subject consistency in the user speech in step S53 and the speech in step S57 are low.

The reason for this is that the subject in step S53 is about the lunch but the subject is changed to the dinner in step S57.

As a result of this, the learning processing section 153 determines that the possibility that the (first candidate) in the "data on the degrees of confidence in recognition of the user speech" stored in the learning candidate data DB 163 is incorrect is high, and lowers the degree-of-confidence value of the (first candidate). For example, the order of the candidates is changed as follows:

(first candidate) Seven o'clock (shichi-ji); and (second candidate) One o'clock (ichi-ji).

On the basis of the re-recognition result, the information processing apparatus 10 gives, in step S58, the following system speech:

system speech=You can choose course A, course B, or course C. Course C is recommended.

In this system speech, the result obtained by the fact that the information processing apparatus 10 has correctly re-recognized user speech in step S53="Availability of reservation at seven o'clock (shichi-ji)" is reflected.

Subsequently, in step S59, the user 1 further gives the following user speech:

user speech=Make a reservation for course C at 19:00.

The learning processing section 153 of the information processing apparatus 10 having received this user speech updates the "data on the degrees of confidence in recognition of the user speech" stored in the learning candidate data DB 163.

The learning processing section 153 analyzes the context consistency and subject consistency in the user speech in step S53 and the user speech in step S57.

It is to be noted that, at this point of time, the user speech in step S53 is recognized as the first candidate in the "data on the degrees of confidence in recognition of the user speech" stored in the learning candidate data DB 163, that is, (first candidate) Seven o'clock (shichi-ji)=the degree of confidence (0.9).

In the example depicted in FIG. 8, the learning processing section 153 determines that the context consistency and subject consistency in the user speech in step S53 and the user speech in step S57 are high.

The reason for this is that both the subject in step S53 and the subject in step S57 are about the evening.

As a result of this, the possibility that the (first candidate) in the "data on the degrees of confidence in recognition of the user speech" stored in the learning candidate data DB 163 is a correct result is determined to be high. Then, the degree-of-confidence value of the (first candidate) is raised, and the values of the remaining candidates are updated according to the similarities to the words constituting the (first candidate).

Next, in step S58, the information processing apparatus 10 gives, as a response to the user speech, the following system speech:

system speech=Reservation at 19:00 is made.

At the point of time of giving this system speech, the information processing apparatus 10 has correctly recognized user speech in step S53="Availability of reservation at seven o'clock."

At this point of time, the degree of confidence of the first candidate in the "data on the degrees of confidence in recognition of the user speech" stored in the learning candidate data DB 163 is 0.9. That is, (first candidate) Seven o'clock (shichi-ji)=the degree of confidence (0.9).

For example, in a case where a threshold=0.9 or greater is set for the degree of confidence, the learning processing section 153 determines that this candidate is a correct recognition result. Then, data on this candidate is stored in the learning data DB 162, in association with the user speech voice data.

That is, the following pieces of data are recorded in association with each other in the learning data DB 162, as explained above with reference to FIG. 6:

(a) voice data corresponding to the user speech; and
(b) what is spoken in the user speech.

The data recorded in the learning data DB 162 is used for voice recognition and meaning interpretation of a subsequent user speech. Thus, misrecognition is reduced.

[5-3. (Process Example 3) Process Example for Handling Case where Misrecognition has Occurred Regarding Community]

Next, as process example 3, a process example for handling a case where misrecognition has occurred regarding a community will be explained with reference to FIG. 10.

Some communities are also called by various names according to backgrounds. For example, "Geidai" often means Tokyo Geijutsu Daigaku (Tokyo University of the Arts) in Kanto region, but means Osaka Geijutsu Daigaku (Osaka University of Arts), etc., in Kansai region.

FIG. 10 depicts an example of speeches including "Meidai." The word "Meidai" is often regarded as an abbreviation of Meiji University. However, in Tokai area, Nagoya University is sometimes called "Meidai." In this example, the user 1 states Meidai in Nagoya afterwards, thereby acquiring correct information from the information processing apparatus 10.

As depicted in FIG. 10, in step S71, the user 1 first gives the following user speech:

user speech=When is the date of examination for Meidai (Nagoya university)?

This user speech of the user 1 is an inquiry regarding the examination date of Nagoya University in Nagoya.

Meanwhile, the information processing apparatus 10 having received this user speech executes the voice recognition process at the voice recognition section 151 of the user speech analysis section 150 and sets plural candidates which are each presumed as the user speech, that is, user speech candidates, and further, sets, for each of the candidates, the degree of confidence (initial value) based on the consistency with the voice recognition result. That is, "data on the degrees of confidence in recognition of the user speech" is generated.

For example, the "data on the degrees of confidence in recognition of the user speech" including the following user speech candidates is generated:

(first candidate) Meidai (Meiji University); and
(second candidate) Meidai (Nagoya University).

It is to be noted that, here, only data on the candidates of a word indicating a community included in the user speech will be extracted and explained.

The "data on the degrees of confidence in recognition of the user speech" generated by the voice recognition section 151 is inputted from the voice recognition section 151 to the learning processing section 153 and is stored in the learning candidate data DB 163.

Further, the learning processing section 153 executes the process of updating the degrees of confidence in accordance with the progress of a subsequent interaction between the user and the information processing apparatus 10.

As a result of the voice recognition process at the voice recognition section 151, the possibility that the user speech in step S71 is (first candidate) Meidai (Meiji University) is determined to be the highest. On the basis of this determination result, the information processing apparatus 10 gives, in step S72, the following system speech:

system speech=It's February 20 (Meiji University).

This system speech is based on the result obtained by the fact that the information processing apparatus 10 has misrecognized the user speech in step S71 as "When is the date of examination for Meidai (Meiji University)?"

Subsequently, in step S73, the user 1 gives the following user speech:

user speech=Tell me how to get there.

This user speech of the user 1 is an inquiry regarding the way to Nagoya University.

The learning processing section 153 of the information processing apparatus 10 having received this user speech has misrecognized the user speech in step S71 as "When is the date of examination for Meidai (Meiji University)?"

Accordingly, the information processing apparatus 10 interprets that the user has asked the way to Meiji University, and thus, gives, as a response to user speech in step S74, the following system speech:

system speech=It is a three-minute walk from Ochanomizu station.

Subsequently, in step S75, the user 1 gives the following user speech:

user speech=How about Meidai in Nagoya?

The learning processing section 153 of the information processing apparatus 10 having received this user speech updates the "data on the degrees of confidence in recognition of the user speech" stored in the learning candidate data DB 163.

The learning processing section 153 analyzes the context consistency and subject consistency in the user speech recognition result in step S71="When is the date of examination for Meidai (Meiji University)?" and the user speech recognition result in step S75="How about Meidai in Nagoya?"

In the example in FIG. 10, the learning processing section 153 determines that the context consistency and subject consistency in the user speech in step S71 and the user speech in step S75 are low.

The reason for this is that the subject in step S71 is about Meiji University but the subject is changed to the Nagoya University in step S75.

As a result of this, the learning processing section 153 determines that the possibility that the (first candidate) in the "data on the degrees of confidence in recognition of the user speech" stored in the learning candidate data DB 163 is incorrect is high, and lowers the degree-of-confidence value of the (first candidate). For example, the order of the candidates is changed as follows:

(first candidate) Meidai (Nagoya University); and
(second candidate) Meidai (Meiji University).

The learning processing section 153 stores data on the (first candidate) Meidai (Nagoya University) in the learning data DB 162.

The data recorded in the learning data DB 162 is used for voice recognition and meaning interpretation of a subsequent user speech. Thus, misrecognition is reduced.

On the basis of this re-recognition result, the information processing apparatus 10 gives, in step S76, the following system speech:

system speech=The examination date is February 10, and Meidai in Nagoya is a five-minute walk from Nagoya Daigaku Station.

In this system speech, a result obtained by the fact that the information processing apparatus 10 has correctly re-recognized user speech in step S71="When is the date of examination for Nagoya University (Meidai)?" is reflected.

In this example, the system speech in step S76 includes a response for correcting all the system responses incorrectly made in steps S72 and S74.

That is, the system responses made in steps S72 and S74 are based on misrecognition of the user speech in step S71, and thus, differ from information that is required by the user.

In a case where the information processing apparatus 10 has provided information different from that requested by the user, the information processing apparatus 10 generates and outputs a system response including information fully correcting the different information provided.

This process prevents the user from recognizing incorrect information outputted by the information processing apparatus 10, as it is.

It is to be noted that each of the process examples explained above with reference to FIGS. 8 to 10 is based on the premise that user's background data is not stored in the storage section and is unavailable in the information processing apparatus 10.

However, in a case where context information, such as user's background information, is stored as already learned data in the storage section 160, this information can be used for processes.

For example, in a case where user information indicating that a user having given a speech is from Nagoya is stored in the storage section 160 or in a case where context information indicating that the user has talked about Nagoya many times is stored in the storage section 160, an evaluation value of the degree of confidence for the user speech can be set by reflecting the above information. Accordingly, correct recognition can be made more speedily.

For example, for "Fushimi" explained above with reference to FIG. 8, "data on the degrees of confidence in recognition of the user speech" in which Fushimi of Nagoya is set as the (first candidate) can be generated on the basis of user information stored in the storage section 160. Accordingly, correct recognition can be made more speedily.

[6. System Speech which is Made in Case where Occurrence of Misrecognition is Determined]

Next, an explanation will be given of a system speech which is given in a case where the information processing apparatus 10 determines that misrecognition of a user speech has occurred.

In a case where the information processing apparatus 10 determines that misrecognition of the user speech has occurred, examples of a form of giving a system speech include the following:

(a) correcting all the system speeches by retracing the conversation;
(b) correcting only an erroneous part;
(c) correcting only a necessary part, which is decided on the basis of the degree of importance, for example; and
(d) reporting only occurrence of an error and encouraging the user to ask a question again.

This may be set by the user, or a selection thereof may be made by the learning processing section 153 or the response generation section 171 on the basis of its own decision.

It is to be noted that the system speeches are given by the response generation section 171.

For example, in a case where the learning processing section 153 changes the first candidate in the data on the degrees of confidence in recognition of the user speech and determines occurrence of misrecognition, the learning processing section 153 outputs information regarding this misrecognition to the response generation section 171.

According to the information, the response generation section 171 gives a system speech based on any one of the setting (a) to the setting (d) described above.

An explanation will be given of specific examples of handling by the system.

(a) Correcting all the system speeches by retracing the conversation

In the process of correcting all the system speeches by retracing the conversation, all the system responses included in interactions made so far, the system responses being counted from a system response made in response to a user speech for which occurrence of misrecognition has been determined to the latest one, are retraced to give a system speech again on the basis of correct recognition.

For example, in the process example explained above with reference to FIG. 7, a system speech which is given after the information processing apparatus 10 determines that misrecognition has occurred includes information regarding all of the following:

a response regarding the weather in Fushimi of Nagoya;
presentation of the way to Fushimi;
presentation of the way to Nagoya; and
presentation of the timetable of Higashiyama Line.

The system speech including information about all of the above is given.

(b) Correcting only an erroneous part

In the process of correcting only an erroneous part, all the system responses included in interactions made so far, the system responses being counted from a system response made in response to a user speech for which occurrence of misrecognition has been determined to the latest one, are retraced, as in the process of correcting all the system speeches, but only an erroneous part is selected, and then, a speech is given.

For example, in the process example explained above with reference to FIG. 7, system speeches which are given after the information processing apparatus 10 determines that misrecognition has occurred include the following:

a response regarding the weather in Fushimi of Nagoya; and the way to Fushimi.

Only these speeches are required to be made.

The result of misrecognition does not affect the way to Nagoya or the timetable of Higashiyama Line, and thus, any speeches thereabout are not given.

(c) Correcting only a necessary part, which is decided on the basis of the degree of importance, for example This process is basically similar to the process example for (b) correcting only an erroneous part. However, in this process, the importance of a speech is determined, and a speech based on a correct recognition result is given only for information determined to be important.

For example, the learning processing section 153 calculates conversation importance by referring to the important word dictionary DB stored in the storage section 160. In a case where misrecognition has occurred, the importance of conversations made so far is calculated, and a speech for correcting only the conversation determined to have high importance is given.

In addition, the order of the conversations may be used in the importance calculation process such that, for example, the importance of a conversation made first is set to be high.

(d) Reporting only occurrence of an error and encouraging the user to ask a question again This process is a method of reporting only occurrence of an error without particularly giving any speech to make a correction.

For example, in the process example explained above with reference to FIG. 7, the information processing apparatus 10 reports, to the user, that Fushimi of Nagoya has been misrecognized as Fushimi of Kyoto and encourages the user to ask a question again.

[7. Sequence of Processing which is Executed by Information Processing Apparatus]

Next, with reference to the flowchart of FIG. 11 and subsequent drawings, an explanation will be given of a sequence of processing which is executed by the information processing apparatus 10.

Processing based on the flowchart depicted in FIG. 11 and subsequent drawings is executed in accordance with a program stored in the storage section of the information processing apparatus 10, for example. The processing can be executed as a program execution process by means of a processor such as a CPU having a program executing function, for example.

Steps in the flow depicted in FIG. 11 will be explained.

(Step S101)

First, in step S101, the information processing apparatus 10 receives a user speech.

This process is executed by the voice input section 101 of the information processing apparatus 10 depicted in FIG. 5.

(Step S102)

Next, in step S102, the information processing apparatus 10 executes voice recognition and meaning analysis of the user speech.

This process is executed by the voice recognition section 151 and the speech meaning analysis section 152 of the information processing apparatus 10 depicted in FIG. 5.

(Step S103)

Then, in step S103, the information processing apparatus 10 generates data on degrees of confidence in recognition of the user speech in which plural user speech candidates are associated with respective degrees of confidence according to the voice recognition result of the user speech.

This process is executed by the voice recognition section 151 of the information processing apparatus 10 depicted in FIG. 5. The voice recognition section 151 of the user speech analysis section 150 generates plural user speech candidates for one user speech and performs initial setting of the degrees of confidence of the respective candidates.

For example, in the example explained above with reference to FIG. 7, in response to the user speech in step S01=Kyo no tenki wa (What does the weather look like today?), the data on the degrees of confidence in recognition of the user speech including the following is generated:

(first candidate) Kyoto no tenki wa (What does the weather look like in Kyoto?)=the degree of confidence (0.7);

(second candidate) Kyo no tenki wa (What does the weather look like today?)=the degree of confidence (0.5);

(third candidate) Kyo no denki wa (What is today's electricity?)=the degree of confidence (0.3); and (fourth candidate) Bunkyo no tenki wa (What does the weather look like in Bunkyo?)=the degree of confidence (0.2).

The voice recognition section 151 generates plural voice recognition candidates for one user speech and sets the degrees of confidence (initial values) of the respective candidates on the basis of the consistency of each of the candidates to the recognition result. It is to be noted that the degree of confidence ranges from 1.0 to 0.0 in the present example; the highest degree of confidence is 1.0, and the lowest degree of confidence is 0.0.

The data on the degrees of confidence in recognition of the user speech generated by the voice recognition section 151 is stored in the learning candidate data DB 163 of the storage section 1360 via the learning processing section 153.

It is to be noted that, as explained above with reference to FIG. 6, each of the following pieces of data are stored in association with one another in the learning candidate data DB 163:

(a) voice data corresponding to the user speech;

(b) "data on the degrees of confidence in recognition of the user speech";

(c) data on morphological analysis of each of the user speech candidates;

(d) data on vowel analysis of each of the user speech candidates; and (e) data on syntax analysis of each of the user speech candidates.

(Step S104)

Next, in step S104, the information processing apparatus 10 determines whether or not preceding data on degrees of confidence in recognition of a user speech, the preceding data corresponding to the preceding speech, is already stored in the storage section 160.

This process is executed by the learning processing section 153 of the information processing apparatus 10 depicted in FIG. 5. In step S104, the learning processing section 153 of the user speech analysis section 150 determines whether or not the preceding data on the degrees of confidence in recognition of the user speech, the preceding data corresponding to the preceding speech, is already stored in the learning candidate data DB 163 of the storage section 160.

In the case where the preceding data is already stored, the process proceeds to step S105.

In the case where the preceding data is not stored, the process proceeds to step S108.

(Step S105)

In a case where, in step S104, it is determined that the preceding data on the degrees of confidence in recognition of the user speech, the preceding data corresponding to the preceding speech, has already been stored in the learning candidate data DB 163 of the storage section 160, the process of step S105 is executed.

In step S105, the preceding data on the degrees of confidence in recognition of the user speech that has already been stored in the learning candidate data DB 163 is updated on the basis of analysis of the context and subject of the interaction history.

This process is executed by the learning processing section 153 of the information processing apparatus 10 depicted in FIG. 5.

For example, in the example explained above with reference to FIG. 7, the preceding data on the degrees of confidence in recognition of the user speech that has already been stored in the learning candidate data DB 163 is data on the degrees of confidence in recognition of the user speech generated on the basis of the speech in step S01.

At a stage when the user speech in step S03 or subsequent steps in FIG. 7, for example, is inputted, the learning processing section 153 executes the process of updating the degrees of confidence in the preceding data.

The learning processing section 153 executes context analysis and subject analysis on a series of interactions made between the user and the information processing apparatus after step S01, and determines whether or not the context and subject that are consistent with the recognition result of the user speech in step S01 previously obtained by the information processing apparatus are continuously present.

For example, in a case where the consistency is determined to be high, the possibility that the (first candidate) in the "data on the degrees of confidence in recognition of the user speech" stored in the learning candidate data DB 163 is a correct result is determined to be high. Then, the degree-of-confidence value of the (first candidate) is raised, and the values of the remaining candidates are updated according to the similarities to the words constituting the (first candidate).

On the other hand, in a case where the consistency is determined to be low, the possibility that the (first candidate) in the "data on the degrees of confidence in recognition of the user speech" stored in the learning candidate data DB 163 is misrecognition is determined to be high. Then, the degree-of-confidence value of the (first candidate) is lowered, and the values of the remaining candidates are updated according to the similarities to the words constituting the (first candidate).

(Step S106)

Next, in step S106, the information processing apparatus 10 determines whether or not the first candidate in the preceding data on the degrees of confidence in recognition of the user speech is changed and whether or not misrecognition has occurred.

In a case where the first candidate in the preceding data on the degrees of confidence in recognition of the user speech is changed and occurrence of misrecognition is determined, the process proceeds to step S107.

On the other hand, in a case where the first candidate in the preceding data on the degrees of confidence in recognition of the user speech is unchanged and occurrence of misrecognition is not determined, the process proceeds to step S108.

(Step S107)

In a case where the first candidate in the preceding data on the degrees of confidence in recognition of the user speech is changed and occurrence of misrecognition is determined in step S106, the process proceeds to step S107.

In step S107, the information processing apparatus 10 gives a system speech based on the correct recognition result, according to the result of determination of the misrecognition.

This process is executed by the learning processing section 153 and the response generation section 171, etc. of the information processing apparatus 10 depicted in FIG. 5.

In a case where the first candidate in the preceding data on the degrees of confidence in recognition of the user speech is changed and occurrence of misrecognition is determined, the learning processing section 153 outputs information regarding this misrecognition to the response generation section 171.

According to this information, the response generation section 171 gives a system speech according to, for example, any one of the following settings:

(a) correcting all the system speeches by retracing the conversation;

(b) correcting only an erroneous part;

(c) correcting only a necessary part which is decided on the basis of the degree of importance, for example; and (d) reporting only occurrence of an error and encouraging the user to ask a question again.

(Step S108)

On the other hand, in a case where the first candidate in the preceding data on the degrees of confidence in recognition of the user speech is unchanged and occurrence of misrecognition is not determined in step S106, the process proceeds to step S108.

In step S108, the information processing apparatus 10 gives a system speech based on the recognition result of the user speech.

It is to be noted that, in a case where the preceding data on the degrees of confidence in recognition of the user speech, the preceding data corresponding to the preceding speech, is determined to be not stored in the learning candidate data DB 163 of the storage section 160 in step S104, the process also proceeds to step S108, and a system speech based on the recognition result of the user speech is given.

It is to be noted that, though not illustrated in the flow, the "data on the degrees of confidence in recognition of the user speech" stored in the learning candidate data DB 163 is sequentially updated by the learning processing section 153, but the updating process is halted at a certain point of time, and then, after the updating process is halted, a process of storing the data in the learning data DB 162 is executed.

As explained above with reference to FIG. 6, a timing for halting the degree-of-confidence updating process and storing the data in the learning data DB 162 is any one of the following timings:

(1) when the degree of confidence of the user speech candidate at the highest rank is unchanged for a certain period of time;

(2) when the degree of confidence of the user speech candidate at the highest rank becomes equal to or greater than a threshold specified in advance; and (3) when a subject change in user speeches is recognized.

In a case where any one of the above events (1) to (3) occurs, the learning processing section 153 halts data updating of the degrees of confidence of the plural user speech candidates stored in the learning candidate data DB 163 and executes the process of storing the data in the learning data DB 162.

The data recorded in the learning data DB 162 is used for voice recognition and meaning interpretation of a subsequent user speech. Thus, misrecognition is reduced.

[8. Configuration Example of Information Processing Apparatus and Information Processing System]

While the processing which is executed by the information processing apparatus 10 according to the present disclosure has been explained, all the processing functions of the components of the information processing apparatus 10 depicted in FIG. 5 can be included in a single apparatus, such as an agent device owned by a user, or an apparatus such as a smartphone or a PC, but may partially be executed in a server or the like.

FIGS. 12A and 12B depict system configuration examples.

In FIGS. 12A and 12B, FIG. 12A configuration example 1 of an information processing system depicts an example in which almost all the functions of the information processing apparatus depicted in FIG. 5 are included in an information processing apparatus 410, which is a single apparatus serving as a user terminal, such as a smartphone or PC owned by a user, or an agent device including a voice input/output function and an image input/output function.

The information processing apparatus 410 which is comparable to a user terminal communicates with a service providing server 420 only when using an external service at a time of generating a response sentence, for example.

The service providing server 420 is, for example, a music providing server, a content providing server for movies, etc., a game server, a weather information providing server, a traffic information providing server, a medical information providing server, a tourism information providing server, or the like, and includes a server group capable of providing information that is necessary to execute a process in response to a user speech and to generate a response.

On the other hand, in FIGS. 12A and 12B, FIG. 12B configuration example 2 of an information processing system depicts a system example in which some of the functions of the information processing apparatus depicted in FIG. 5 are formed in the information processing apparatus 410 that is a user terminal such as a smartphone, a PC, or an agent device owned by the user, and the other functions are implemented in a data processing server 460 that is capable of communicating with the information processing apparatus.

For example, only the input section 110 and the output section 120 of the apparatus depicted in FIG. 5 may be provided on the information processing apparatus 410 side which is the user terminal side, and all the remaining functions may be implemented on the server side.

It is to be noted that the form of allocating the user terminal-side functions and the server-side functions can be set in various ways. Further, one function may be implemented on both sides.

[9. Hardware Configuration Example of Information Processing Apparatus]

Next, with reference to FIG. 13, an explanation will be given of a hardware configuration example of the information processing apparatus.

Figure 13:
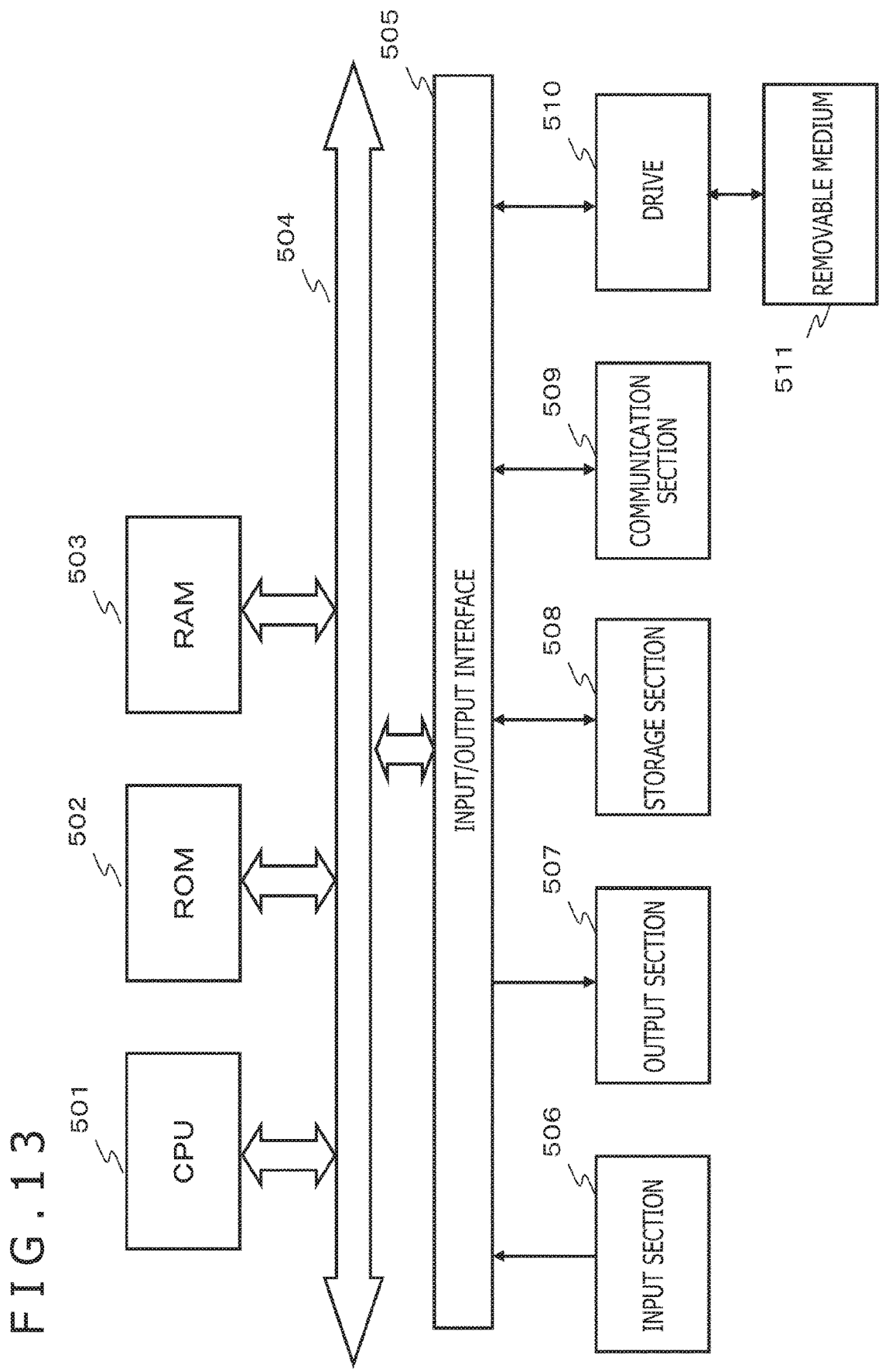
FIG. 13 is an explanatory diagram of a hardware configuration example of the information processing apparatus.

The hardware, which will be explained with reference to FIG. 13, is a hardware configuration example of the information processing apparatus explained above with reference to FIG. 5, and is also one example of the hardware configuration of the information processing apparatus constituting the data processing server 460 explained above with reference to FIGS. 12A and 12B.

A CPU (Central Processing Unit) 501 functions as a control section or data processing section for executing various processes in accordance with a program stored in a ROM (Read Only Memory) 502 or a storage section 508. For example, the processing based on the sequence explained in the above embodiment is executed. A RAM (Random Access Memory) 503 stores a program to be executed by the CPU 501, data, etc. The CPU 501, the ROM 502, and the RAM 503 are mutually connected via a bus 504.

The CPU 501 is connected to an input/output interface 505 via the bus 504. An input section 506 including various switches, a keyboard, a mouse, a microphone, or a sensor and an input section 507 including a display, a loudspeaker, or the like are connected to the input/output interface 505. The CPU 501 executes various processes in response to a command inputted through the input section 506 and outputs the process result to the output section 507, for example.

The storage section 508 connected to the input/output interface 505 includes, for example, a hard disk and stores a program to be executed by the CPU 501 and various types of data. A communication section 509 functions as a transmission/reception section for Wi-Fi communication, Bluetooth (registered trademark) (BT) communication, and other types of data communication over a network such as the internet or a local area network and communicates with an external apparatus.

A drive 510 connected to the input/output interface 505 drives a removable medium 511 which is, for example, a magnetic disk, an optical disk, a magneto-optical disk, or a semiconductor memory such as a memory card, and records or reads out data.

[10. Conclusion of Configuration According to Present Disclosure]

The embodiment according to the present disclosure has been explained so far in detail with reference to the specific embodiment. However, it is obvious that a person skilled in the art can make a modification or substitution on the embodiment within the scope of the gist of the present disclosure. That is, the present invention has been disclosed by exemplifications, and thus, should not be interpreted in a limited manner. In order to assess the gist of the present disclosure, the claims should be considered.

It is to be noted that the technology disclosed herein can have the following configurations.

(1)

An information processing apparatus including:

a voice recognition section that executes a voice recognition process on a user speech; and a learning processing section that executes a process of updating a degree of confidence on the basis of an interaction made between a user and the information processing apparatus after the user speech, the degree of confidence being an evaluation value indicating reliability of a voice recognition result of the user speech.

(2)

The information processing apparatus according to (1), in which the learning processing section executes the process of updating the degree of confidence, by analyzing context consistency or subject consistency in the interaction made between the user and the information processing apparatus after the user speech.

(3)

The information processing apparatus according to (1) or (2), in which the voice recognition section generates data on degrees of confidence in recognition of the user speech in which data plural user speech candidates based on the voice recognition result of the user speech are associated with degrees of confidence which are evaluation values each indicating reliability of the corresponding user speech candidate, and the learning processing section updates degree-of-confidence values in the data on the degrees of confidence in recognition of the user speech, by analyzing context consistency or subject consistency in the interaction made between the user and the information processing apparatus after the user speech.

(4)

The information processing apparatus according to (3), in which the data on the degrees of confidence in recognition of the user speech includes a list in which a user speech candidate having a highest degree-of-confidence value is set as a first candidate, and the remaining candidates are listed, from a second candidate, in descending order of the degree-of-confidence values, and in a case where the first candidate is changed as a result of updating of the degree-of-confidence values in the data on the degrees of confidence in recognition of the user speech, the learning processing section determines that misrecognition of the user speech has occurred.

(5)

The information processing apparatus according to (4), in which after determining that misrecognition of the user speech has occurred, the learning processing section reports the occurrence of misrecognition to a response processing section, and the response processing section outputs a system response based on a correct recognition result, according to the determination result of misrecognition.

(6)

The information processing apparatus according to (5), in which the response processing section executes any one of the following (a) to (d):

(a) a process of correcting all responses made after the user speech;

(b) a process of correcting only an erroneous part;

(c) a process of making a correction according to a degree of importance; and (d) a process of reporting only occurrence of an error.

(7)

The information processing apparatus according to any one of (3) to (6), in which the learning processing section halts, upon establishment of a condition specified in advance, the process of updating the data on the degrees of confidence in recognition of the user speech, and stores, as learned data, in a storage section, data on a first candidate which is a user speech candidate at a highest rank having a highest degree-of-confidence value and recorded in the data on the degrees of confidence in recognition of the user speech.

(8)

The information processing apparatus according to (7), in which the specified condition is any one of the following:

(condition 1) the user speech candidate at the highest degree-of-confidence rank is unchanged for a certain period of time;

(condition 2) the degree of confidence of the user speech candidate at the highest rank becomes equal to or greater than a threshold specified in advance; or (condition 3) a subject change in user speeches is recognized.

(9)

An information processing system including:

a user terminal; and a data processing server, in which the user terminal includes a voice input section that inputs a user speech, and the data processing server includes a voice recognition section that executes a voice recognition process on the user speech received from the user terminal, and a learning processing section that executes a process of updating a degree of confidence on the basis of an interaction made between a user and an information processing apparatus after the user speech, the degree of confidence being an evaluation value indicating reliability of a voice recognition result of the user speech.

(10)

An information processing method which is executed by an information processing apparatus, the method including:

a step of executing a voice recognition process on a user speech by means of a voice recognition section; and a step of executing, by means of a learning processing section, a process of updating a degree of confidence on the basis of an interaction made between a user and the information processing apparatus after the user speech, the degree of confidence being an evaluation value indicating reliability of a voice recognition result of the user speech.

(11)

An information processing method which is executed by an information processing system including a user terminal and a data processing server, the method including:

executing, by means of the user terminal, a voice input process of inputting a user speech; and executing, by means of the data processing server, a voice recognition process on the user speech received from the user terminal, and a process of updating a degree of confidence on the basis of an interaction made between a user and an information processing apparatus after the user speech, the degree of confidence being an evaluation value indicating reliability of a voice recognition result of the user speech.

(12)

A program for causing an information processing apparatus to execute information processing, the program being configured to:

cause a voice recognition section to execute a voice recognition process on a user speech; and cause a learning processing section to execute a process of updating a degree of confidence on the basis of an interaction made between a user and the information processing apparatus after the user speech, the degree of confidence being an evaluation value indicating reliability of a voice recognition result of the user speech.

Further, a series of the processes described herein can be executed by hardware, software, or a composite structure thereof. When the processes are executed by software, a program having a process sequence therefor recorded therein can be executed after being installed into a memory incorporated in dedicated hardware of a computer or can be executed after being installed into a general-purpose computer capable of executing various processes. For example, such a program may be recorded in advance in a recording medium. The program can be installed into the computer from the recording medium. Alternatively, the program can be received over a network such as a LAN (Local Area Network) or the internet and be installed into a recording medium such as an internal hard disk.

It is to be noted that the processes described herein are not necessarily executed in the described time-series order, and the processes may be executed parallelly or separately, as needed or according to the processing capacity of an apparatus for executing the processes. Further, in the present description, a system refers to a logical set structure including plural apparatuses, and the apparatuses of the structure are not necessarily included in the same casing.

INDUSTRIAL APPLICABILITY

As explained so far, the configuration of one embodiment according to the present disclosure implements an apparatus and a method for detecting misrecognition of a user speech on the basis of a subsequent interaction.

Specifically, for example, the information processing apparatus includes a voice recognition section that executes a voice recognition process on a user speech and a learning processing section that executes a process of updating, on the basis of an interaction made between a user and the information processing apparatus after the user speech, the degree of confidence which is an evaluation value indicating the reliability of a voice recognition result of the user speech. The voice recognition section generates data on degrees of confidence in recognition of the user speech in which data plural user speech candidates based on the voice recognition result of the user speech are associated with the degrees of confidence of the user speech candidates. Each of the degrees of confidence is an evaluation value indicating reliability of the corresponding user speech candidate. The learning processing section updates the degree-of-confidence values in the data on the degrees of confidence in recognition of the user speech, by analyzing context consistency or subject consistency in the interaction made between the user and the information processing apparatus after the user speech.

According to this configuration, an apparatus and a method for detecting misrecognition of a user speech on the basis of a following interaction can be implemented.

REFERENCE SIGNS LIST

10: Information processing apparatus
12: Microphone
13: Display section
14: Loudspeaker
20: Server
30: External apparatus
101: Voice input section
102: Voice output section
103: Image output section
130: Data processing section
150: User speech analysis section
151: Voice recognition section
152: Speech meaning analysis section
153: Learning processing section
160: Storage section
161: Speech analysis dictionary DB
162: Learning data DB
163: Learning candidate data DB
171: Response generation section
172: Voice synthesis section
173: To-be-displayed image generation section
410: Information processing apparatus
420: Service providing server
460: Data processing server
501: CPU
502: ROM
503: RAM
504: Bus
505: Input/output interface
506: Input section
507: Output section
508: Storage section
509: Communication section
510: Drive
511: Removable medium

The invention claimed is:

1. An information processing apparatus, comprising:
at least one processor configured to:
execute a voice recognition process on a user speech to generate a plurality of user speech candidates associated with the user speech;
update a degree of confidence of each user speech candidate of the plurality of user speech candidates based on an interaction between a user and the information processing apparatus, wherein
the interaction between the user and the information processing apparatus is after the user speech,
each user speech candidate of the plurality of user speech candidates is a voice recognition result of the voice recognition process, and
the degree of confidence is an evaluation value that indicates reliability of the voice recognition result of the user speech;
determine a misrecognition of the user speech based on the update of the degree of confidence of a first user speech candidate of the plurality of user speech candidates;
correct a specific part of a system response based on the determination of the misrecognition of the user speech and a degree of importance associated with the specific part, wherein the degree of importance associated with the specific part is with respect to the interaction between the user and the information processing apparatus; and
output the system response which includes the corrected specific part.

2. The information processing apparatus according to claim 1, wherein the at least one processor is further configured to:
analyze one of context consistency or subject consistency in the interaction between the user and the information processing apparatus; and
update the degree of confidence based on the analysis of the one of the context consistency or the subject consistency in the interaction between the user and the information processing apparatus.

3. The information processing apparatus according to claim 1, wherein the at least one processor is further configured to:
generate data which includes the degree of confidence associated with each user speech candidate of the plurality of user speech candidates based on the voice recognition result;
analyze one of context consistency or subject consistency in the interaction between the user and the information processing apparatus; and
update a value of the degree of confidence of each user speech candidate of the plurality of user speech candidates in recognition of the user speech based on the analysis of the one of the context consistency or the

41 subject consistency in the interaction between the user and the information processing apparatus.

4. The information processing apparatus according to claim 3, wherein the data further includes a list in which the first user speech candidate of the plurality of user speech candidates having a highest value of the degree of confidence among the plurality of user speech candidates is set as a first candidate, and a set of user speech candidates of the plurality of user speech candidates which excludes the first user speech candidate is listed, from a second candidate of the set of user speech candidates, in descending order of the value of the degree of confidence of each user speech candidate of the set of user speech candidates, and the at least one processor is further configured to determine the misrecognition of the user speech in a case where the first candidate is changed based on the update of the value of the degree of confidence of the first user speech candidate.

5. The information processing apparatus according to claim 4, wherein the at least one processor is further configured to report the misrecognition based on the determination of the misrecognition.

6. The information processing apparatus according to claim 5, wherein the at least one processor is further configured to execute at least one of:

correction of all responses of the system response made after the user speech;

correction of an erroneous part of the system response; and reporting occurrence of an error in the system response.

7. The information processing apparatus according to claim 3, wherein the at least one processor is further configured to:

halt, based on a specific condition, the updation of the value of the degree of confidence of each user speech candidate of the plurality of user speech candidates; and store, as learned data, first data on the first user speech candidate of the plurality of user speech candidates whose value of the degree of confidence is highest among the plurality of user speech candidates, wherein the first user speech candidate is stored in a storage section, the first user speech candidate is ranked at a highest rank among the plurality of user speech candidates, and the first data is recorded in the data in recognition of the user speech.

8. The information processing apparatus according to claim 7, wherein the specific condition is one of:

the first user speech candidate at the highest rank is unchanged for a specific period of time;

the value of the degree of confidence of the first user speech candidate becomes equal to or greater than a threshold value; or a subject change in user speeches, subsequent to the user speech, is recognized.

9. An information processing system, comprising:

a user terminal that includes a microphone configured to receive a user speech; and a data processing server that includes at least one processor configured to:

42 execute a voice recognition process on the user speech received from the user terminal to generate a plurality of user speech candidates associated with the user speech;

update a degree of confidence of each user speech candidate of the plurality of user speech candidates based on an interaction between a user and an information processing apparatus, wherein the interaction between the user and the information processing apparatus is after the user speech, each user speech candidate of the plurality of user speech candidates is a voice recognition result of the voice recognition process, and the degree of confidence is an evaluation value that indicates reliability of the voice recognition result of the user speech;

determine a misrecognition of the user speech based on the update of the degree of confidence of at least one user speech candidate of the plurality of user speech candidates;

correct a specific part of a system response based on the determination of the misrecognition of the user speech and a degree of importance associated with the specific part, wherein the degree of importance associated with the specific part is with respect to the interaction between the user and the information processing apparatus; and output the system response which includes the corrected specific part.

10. An information processing method, comprising:

executing, by a processor, a voice recognition process on a user speech to generate a plurality of user speech candidates associated with the user speech;

updating, by the processor, a degree of confidence of each user speech candidate of the plurality of user speech candidates based on an interaction between a user and an information processing apparatus, wherein the interaction between the user and the information processing apparatus is after the user speech, each user speech candidate of the plurality of user speech candidates is a voice recognition result of the voice recognition process, and the degree of confidence is an evaluation value that indicates reliability of the voice recognition result of the user speech;

determining, by the processor, a misrecognition of the user speech based on the updating of the degree of confidence of at least one user speech candidate of the plurality of user speech candidates;

correcting, by the processor, a specific part of a system response based on the determination of the misrecognition of the user speech and a degree of importance associated with the specific part, wherein the degree of importance associated with the specific part is with respect to the interaction between the user and the information processing apparatus; and outputting, by the processor, the system response including the corrected specific part.

11. An information processing method which is executed by an information processing system including a user terminal and a data processing server, the information processing method comprising:

receiving, by the user terminal, a voice input of a user speech;

executing, by the data processing server, a voice recognition process on the user speech received from the user terminal to generate a plurality of user speech candidates associated with the user speech;
updating, by the data processing server, a degree of confidence of each user speech candidate of the plurality of user speech candidates based on an interaction between a user and an information processing apparatus, wherein
the interaction between the user and the information processing apparatus is after the user speech,
each user speech candidate of the plurality of user speech candidates is a voice recognition result of the voice recognition process, and
the degree of confidence is an evaluation value that indicates reliability of the voice recognition result of the user speech;
determining, by the data processing server, a misrecognition of the user speech based on the updating of the degree of confidence of at least one user speech candidate of the plurality of user speech candidates;
correcting, by the data processing server, a specific part of a system response based on the determination of the misrecognition of the user speech and a degree of importance associated with the specific part, wherein the degree of importance associated with the specific part is with respect to the interaction between the user and the information processing apparatus; and
outputting, by the data processing server, the system response which includes the corrected specific part.

12. A non-transitory computer-readable medium having stored thereon, computer-executable instructions which, when executed by a processor, cause the processor to execute operations, the operations comprising:
executing a voice recognition process on a user speech to generate a plurality of user speech candidates associated with the user speech;
updating a degree of confidence of each user speech candidate of the plurality of user speech candidates based on an interaction between a user and an information processing apparatus, wherein
the interaction between the user and the information processing apparatus is after the user speech,
each user speech candidate of the plurality of user speech candidates is a voice recognition result of the voice recognition process, and
the degree of confidence is an evaluation value that indicates reliability of the voice recognition result of the user speech;
determining a misrecognition of the user speech based on the updating of the degree of confidence of at least one user speech candidate of the plurality of user speech candidates;
correcting a specific part of a system response based on the determination of the misrecognition of the user speech and a degree of importance associated with the specific part, wherein the degree of importance associated with the specific part is with respect to the interaction between the user and the information processing apparatus; and
outputting the system response which includes the corrected specific part.

* * * * *